(12) United States Patent
Tanner et al.

(10) Patent No.: US 7,615,152 B2
(45) Date of Patent: Nov. 10, 2009

(54) WATER FILTER DEVICE

(75) Inventors: John D. Tanner, Plymouth, MN (US);
David James Emmons, Plymouth, MN (US); Richard P. Riedel, Mason, OH (US)

(73) Assignee: PUR Water Purification Products, Inc., Cincinnati, OH (US)

( * ) Notice: Subject to any disclaimer, the term of this patent is extended or adjusted under 35 U.S.C. 154(b) by 290 days.

(21) Appl. No.: 10/643,669

(22) Filed: Aug. 19, 2003

(65) Prior Publication Data

US 2004/0129617 A1 Jul. 8, 2004

Related U.S. Application Data

(63) Continuation-in-part of application No. 10/464,209, filed on Jun. 18, 2003, now abandoned, which is a continuation-in-part of application No. 09/935,962, filed on Aug. 23, 2001, now abandoned, and a continuation-in-part of application No. 09/935,810, filed on Aug. 23, 2001, now abandoned, and a continuation of application No. PCT/US03/05416, filed on Feb. 21, 2003, and a continuation of application No. PCT/US03/05409, filed on Feb. 21, 2003, application No. 10/643,669, which is a continuation-in-part of application No. 10/464,210, filed on Jun. 18, 2003, which is a continuation-in-part of application No. 09/935,962, and a continuation-in-part of application No. 09/935,810, and a continuation of application No. PCT/US03/05416, and a continuation of application No. PCT/US03/05409, application No. 10/643,669, which is a continuation-in-part of application No. 09/935,962, and a continuation-in-part of application No. 09/935,810, and a continuation-in-part of application No. PCT/US03/05416, and a continuation-in-part of application No. PCT/US03/05409.

(51) Int. Cl.
*B01D 35/00* (2006.01)
*B01D 39/00* (2006.01)
*B01D 27/00* (2006.01)
*B01D 29/00* (2006.01)

(52) U.S. Cl. .............. 210/257.1; 210/266; 210/282; 210/473; 210/477; 210/501; 210/502.1; 210/504; 210/505

(58) Field of Classification Search ............... 210/501, 210/502.1, 504, 505, 506, 508, 266, 282, 210/497.1, 473, 477, 252, 259, 257.1, 257.2
See application file for complete search history.

(56) References Cited

U.S. PATENT DOCUMENTS 25,398 A 9/1859 Duchamp (Continued)

FOREIGN PATENT DOCUMENTS

DE 2 357 585 11/1972

(Continued)

*Primary Examiner*—John Kim
(74) *Attorney, Agent, or Firm*—Cynthia L. Clay; Andrew A. Paul; Kelly L. McDow

(57) ABSTRACT

A water filter device for treating untreated drinking water, wherein the water filter device may comprise a connector for providing fluid communication between the water filter device and an untreated drinking water source. The water filter device may comprise a low-pressure water for treating untreated drinking water, the water filter may comprise a water filter material. The water filter may comprise a F-BLR of greater than about 2 logs. The water filter device may comprise a storage housing in fluid communication with the low-pressure water filter. The water filter device may comprise an automatic shutoff valve for arresting the flow of treated drinking water into the storage housing. The water filter device may comprise a dispenser for dispensing treated drinking water from the storage housing. The treated drinking may enter into the storage housing at the rate of at least about 5 mL/min until activating the automatic shutoff valve, such that the flow of treated drinking water into the storage housing is arrested. The water filter device may be a non-electric water filter device.

23 Claims, 9 Drawing Sheets

U.S. PATENT DOCUMENTS

| | | | |
|---|---|---|---|
| 9,622 A | 3/1881 | Best | |
| 531,838 A | 1/1895 | Davis et al. | |
| 543,922 A | 8/1895 | Buckley | |
| 590,020 A | 9/1897 | Myers | |
| 602,883 A | 4/1898 | Tyden | |
| 611,691 A | 10/1898 | Langdon et al. | |
| 673,722 A | 5/1901 | Moulton | |
| D34,658 S | 6/1901 | Weaver | |
| 826,654 A | 7/1906 | Firth | |
| 963,324 A | 7/1910 | Randall | |
| 967,905 A | 8/1910 | Hagg | |
| D41,321 S | 4/1911 | Anderson | |
| 1,043,933 A | 11/1912 | Hildebrand | |
| 1,363,589 A | 12/1920 | Hartman | |
| 1,579,158 A | 3/1926 | Smile | |
| 1,621,684 A | 3/1927 | Rabjohn et al. | |
| 1,674,203 A | 6/1928 | Holz et al. | |
| D76,391 S | 9/1928 | Groak | |
| 1,752,060 A | 3/1930 | Burright et al. | |
| 1,782,850 A * | 11/1930 | Hill | 210/673 |
| 1,806,977 A | 5/1931 | Kenney | |
| D93,910 S | 11/1934 | Camp | |
| D113,679 S | 3/1939 | Neely | |
| D128,316 S | 7/1941 | Roffy | |
| 2,268,076 A | 12/1941 | Lawlor | |
| D133,177 S | 7/1942 | Gross | |
| D136,021 S | 7/1943 | Kraissl, Jr. | |
| 2,335,458 A | 11/1943 | Senyal | |
| 2,372,340 A | 3/1945 | Senyal | |
| D143,545 S | 1/1946 | Pond et al. | |
| 2,633,990 A | 4/1953 | Simpson et al. | |
| D170,472 S | 9/1953 | Monsarrat | |
| D173,603 S | 12/1954 | Atkinson | |
| 2,750,080 A | 6/1956 | Blanchard et al. | |
| 2,811,258 A | 10/1957 | Schleyer et al. | |
| 2,987,187 A | 6/1961 | Comroe | |
| D196,108 S | 8/1963 | Gerber | |
| 3,184,064 A | 5/1965 | Sampson et al. | |
| 3,268,444 A * | 8/1966 | Renn | 210/679 |
| 3,333,703 A * | 8/1967 | Scavuzzo et al. | 210/232 |
| D208,752 S | 9/1967 | Payne | |
| 3,342,335 A | 9/1967 | Gamundi et al. | |
| 3,428,089 A | 2/1969 | Kachergis | |
| D216,978 S | 3/1970 | Greene | |
| 3,539,009 A | 11/1970 | Kudlaty | |
| 3,550,782 A | 12/1970 | Veloz | |
| 3,572,553 A | 3/1971 | Ogden | |
| D221,850 S | 9/1971 | Anderson | |
| 3,670,892 A * | 6/1972 | Baerg et al. | 210/134 |
| 3,692,180 A | 9/1972 | LaRaus | |
| D227,565 S | 7/1973 | Ehret | |
| D227,886 S | 7/1973 | Martinez | |
| D229,178 S | 11/1973 | Mixon | |
| D232,550 S | 8/1974 | Fushihara | |
| 3,847,787 A | 11/1974 | Okazaki et al. | |
| 3,853,761 A | 12/1974 | McClory | |
| 3,856,676 A | 12/1974 | Grimme et al. | |
| D234,356 S | 2/1975 | Holben et al. | |
| D234,357 S | 2/1975 | Humphrey | |
| D234,843 S | 4/1975 | Taylor | |
| D235,143 S | 5/1975 | Ehret | |
| D235,206 S | 5/1975 | Bertrand | |
| D236,263 S | 8/1975 | Dussardier et al. | |
| D236,264 S | 8/1975 | Taylor | |
| D236,265 S | 8/1975 | Dussardier | |
| D236,829 S | 9/1975 | Berry, Jr. et al. | |
| 3,931,009 A | 1/1976 | Davis | |
| 3,939,074 A | 2/1976 | Bray | |
| 3,950,253 A | 4/1976 | Stern | |
| D240,624 S | 7/1976 | MacMurray | |
| D240,731 S | 7/1976 | Free et al. | |
| D242,043 S | 10/1976 | Corder et al. | |
| D242,249 S | 11/1976 | Corder et al. | |
| 4,014,792 A | 3/1977 | Gossett et al. | |
| 4,019,986 A | 4/1977 | Burris et al. | |
| 4,021,343 A | 5/1977 | Tyler | |
| 4,049,550 A | 9/1977 | Obidniak | |
| 4,086,166 A | 4/1978 | Martin | |
| D249,053 S | 8/1978 | Hansrote | |
| D249,054 S | 8/1978 | Hansrote | |
| D249,055 S | 8/1978 | Hansrote | |
| D249,057 S | 8/1978 | Hansrote | |
| 4,110,219 A | 8/1978 | Maples | |
| D249,275 S | 9/1978 | Mackay et al. | |
| D249,701 S | 9/1978 | Maples et al. | |
| D251,380 S | 3/1979 | Casamitjana | |
| 4,147,631 A | 4/1979 | Deines et al. | |
| 4,152,262 A | 5/1979 | Rose | |
| 4,172,796 A | 10/1979 | Corder | |
| D253,715 S | 12/1979 | Emery | |
| 4,190,537 A | 2/1980 | Tondreau et al. | |
| D256,944 S | 9/1980 | Fox, Jr. | |
| 4,252,650 A | 2/1981 | Mas et al. | |
| D258,462 S | 3/1981 | Mixon | |
| 4,277,333 A | 7/1981 | Coppola | |
| 4,368,123 A | 1/1983 | Stanley | |
| D268,866 S | 5/1983 | Desai et al. | |
| 4,391,712 A | 7/1983 | Tyler et al. | |
| D274,930 S | 7/1984 | Joe | |
| 4,504,389 A | 3/1985 | Rundzaitis | |
| D278,650 S | 4/1985 | Slovak et al. | |
| 4,515,692 A | 5/1985 | Chandler et al. | |
| D282,767 S | 2/1986 | Shofner | |
| 4,572,785 A | 2/1986 | Braaten | |
| 4,585,554 A | 4/1986 | Burrows | |
| 4,595,497 A | 6/1986 | Burrows | |
| 4,606,828 A | 8/1986 | Wells | |
| 4,609,466 A | 9/1986 | McCausland et al. | |
| 4,623,451 A | 11/1986 | Oliver | |
| 4,623,467 A | 11/1986 | Hamlin | |
| 4,626,346 A | 12/1986 | Hall | |
| D288,115 S | 2/1987 | McCausland et al. | |
| D289,429 S | 4/1987 | Thumberger | |
| 4,657,674 A | 4/1987 | Burrows | |
| D290,386 S | 6/1987 | Padilla | |
| D290,638 S | 6/1987 | Bishop | |
| 4,670,144 A | 6/1987 | McCausland et al. | |
| 4,678,565 A | 7/1987 | Norton | |
| 4,681,677 A | 7/1987 | Kuh et al. | |
| 4,683,054 A | 7/1987 | Turnbull | |
| 4,686,037 A | 8/1987 | Lang | |
| 4,695,375 A | 9/1987 | Tyler | |
| D292,429 S | 10/1987 | Spink | |
| 4,698,164 A | 10/1987 | Ellis | |
| D293,367 S | 12/1987 | Spink | |
| D295,887 S | 5/1988 | Hopkins | |
| D296,000 S | 5/1988 | Padilla | |
| 4,743,366 A | 5/1988 | Burrows | |
| 4,744,895 A | 5/1988 | Gales et al. | |
| D296,352 S | 6/1988 | Luzenberg | |
| D296,463 S | 6/1988 | Padilla | |
| 4,749,484 A | 6/1988 | Greenhut | |
| 4,752,389 A | 6/1988 | Burrows | |
| 4,759,844 A | 7/1988 | Lipschultz et al. | |
| D297,349 S | 8/1988 | Kronsbein | |
| 4,775,465 A | 10/1988 | Burrows | |
| 4,776,952 A | 10/1988 | Burrows | |
| 4,808,302 A | 2/1989 | Beall, Jr. | |
| 4,816,149 A | 3/1989 | Wekell | |
| 4,830,223 A | 5/1989 | Priest | |
| 4,830,744 A | 5/1989 | Burrows | |
| D301,913 S | 6/1989 | Brown et al. | |
| 4,842,724 A | 6/1989 | Bray et al. | |
| 4,853,117 A | 8/1989 | Burrows | |

| | | |
|---|---|---|
| D303,703 S | 9/1989 | Padilla et al. |
| D304,363 S | 10/1989 | Ruesch |
| 4,879,027 A | 11/1989 | Sanders |
| 4,880,535 A | 11/1989 | Burrows |
| 4,885,081 A | 12/1989 | Oliver |
| 4,885,085 A | 12/1989 | Beall, Jr. |
| D306,754 S | 3/1990 | Petrucci et al. |
| D307,173 S | 4/1990 | Boehnke |
| D307,933 S | 5/1990 | Baer |
| 4,923,091 A | 5/1990 | Sutera |
| 4,936,984 A | 6/1990 | Blandford et al. |
| D309,487 S | 7/1990 | Lieberman |
| D309,494 S | 7/1990 | Riley |
| 4,946,600 A | 8/1990 | Shin |
| 4,968,440 A | 11/1990 | Woodruff |
| 4,969,991 A | 11/1990 | Valadez |
| D312,679 S | 12/1990 | Carrano et al. |
| D314,226 S | 1/1991 | Devine et al. |
| D314,607 S | 2/1991 | Kapec et al. |
| 4,994,184 A | 2/1991 | Thalmann et al. |
| 4,997,553 A | 3/1991 | Clack |
| 5,004,535 A | 4/1991 | Bosko et al. |
| D318,092 S | 7/1991 | Ferguson |
| D318,093 S | 7/1991 | Ferguson |
| D318,315 S | 7/1991 | Sanborn |
| D319,288 S | 8/1991 | Spokoiny |
| 5,037,547 A | 8/1991 | Burrows |
| 5,039,402 A | 8/1991 | Himelstein |
| D319,864 S | 9/1991 | Geneve et al. |
| 5,049,270 A | 9/1991 | Carrano et al. |
| D321,550 S | 11/1991 | Laughlen et al. |
| 5,068,030 A | 11/1991 | Chen |
| 5,069,782 A | 12/1991 | Moyher, Jr. et al. |
| D323,017 S | 1/1992 | Bernstein |
| D323,203 S | 1/1992 | Pedersen |
| 5,078,864 A | 1/1992 | Whittier |
| 5,082,557 A | 1/1992 | Grayson et al. |
| 5,083,442 A | 1/1992 | Vlock |
| D324,721 S | 3/1992 | Kapec et al. |
| 5,108,590 A | 4/1992 | DiSanto |
| 5,110,468 A | 5/1992 | Miyashita et al. |
| 5,111,966 A | 5/1992 | Fridman |
| 5,112,477 A | 5/1992 | Hamlin |
| 5,114,042 A | 5/1992 | Sutera |
| 5,116,502 A | 5/1992 | Ferguson |
| D326,706 S | 6/1992 | Karlsson |
| 5,122,265 A | 6/1992 | Mora et al. |
| 5,128,034 A | 7/1992 | Kool |
| 5,128,036 A | 7/1992 | Svensson |
| 5,131,277 A | 7/1992 | Birdsong et al. |
| D328,777 S | 8/1992 | Thalmann et al. |
| 5,147,533 A | 9/1992 | Lipshultz et al. |
| D330,587 S | 10/1992 | Seeley |
| 5,160,608 A | 11/1992 | Norton |
| D331,446 S | 12/1992 | Gidman |
| D332,131 S | 12/1992 | Chez |
| 5,188,727 A | 2/1993 | Kurth et al. |
| 5,193,892 A | 3/1993 | Swindell |
| 5,203,803 A | 4/1993 | Schoenmeyr |
| D336,760 S | 6/1993 | Raunkjaer |
| 5,223,132 A | 6/1993 | Yoon |
| 5,232,590 A | 8/1993 | Reid |
| 5,238,559 A | 8/1993 | Nieweg |
| 5,248,417 A | 9/1993 | Reid |
| 5,340,967 A | 11/1993 | Muir |
| 5,261,792 A | 11/1993 | Schoenmeyr |
| 5,277,805 A | 1/1994 | Ferguson |
| 5,281,309 A | 1/1994 | Greene |
| D344,322 S | 2/1994 | Kasner et al. |
| 5,282,972 A | 2/1994 | Hanna et al. |
| 5,290,442 A | 3/1994 | Clack |
| 5,296,148 A | 3/1994 | Colangelo et al. |
| D347,462 S | 5/1994 | Douglas |
| 5,316,673 A | 5/1994 | Kohlmann et al. |
| 5,322,625 A | 6/1994 | Rise |
| 5,324,424 A | 6/1994 | Hochgatterer |
| 5,324,434 A | 6/1994 | Oikawa et al. |
| D350,870 S | 9/1994 | Hansen |
| D351,014 S | 9/1994 | Hansen |
| 5,348,647 A | 9/1994 | Chen |
| 5,349,992 A | 9/1994 | Gallo et al. |
| 5,356,531 A | 10/1994 | Rantz |
| D352,200 S | 11/1994 | Hansen |
| 5,368,197 A | 11/1994 | Sutera |
| D353,440 S | 12/1994 | Ito et al. |
| 5,371,221 A * | 12/1994 | Sipos et al. ................. 544/275 |
| 5,393,419 A | 2/1995 | Tiede et al. |
| D356,625 S | 3/1995 | Petrucci et al. |
| 5,395,509 A | 3/1995 | Guerra Cisneros et al. |
| D357,058 S | 4/1995 | Engelhard |
| D358,460 S | 5/1995 | Wren |
| D360,332 S | 7/1995 | Mann |
| 5,435,909 A | 7/1995 | Burrows |
| 5,443,739 A | 8/1995 | Vogel et al. |
| 5,445,729 A | 8/1995 | Monroe et al. |
| 5,447,626 A | 9/1995 | Ido |
| 5,449,456 A | 9/1995 | Bowman |
| D363,760 S | 10/1995 | Morem et al. |
| 5,454,944 A | 10/1995 | Clack |
| 5,464,531 A | 11/1995 | Greene |
| 5,468,387 A | 11/1995 | Solomon |
| 5,478,465 A | 12/1995 | Larson et al. |
| 5,502,978 A | 4/1996 | Field |
| 5,505,120 A | 4/1996 | Albertson |
| D370,521 S | 6/1996 | Archer et al. |
| 5,527,451 A | 6/1996 | Hembree et al. |
| D372,295 S | 7/1996 | Weber |
| 5,536,395 A | 7/1996 | Kuennen et al. |
| 5,536,396 A | 7/1996 | Mudra et al. |
| D372,515 S | 8/1996 | Douglas |
| D372,760 S | 8/1996 | Brancazio et al. |
| 5,560,393 A | 10/1996 | Clack |
| 5,562,824 A | 10/1996 | Magnusson |
| 5,565,100 A | 10/1996 | Deng |
| 5,567,311 A | 10/1996 | Jang |
| 5,580,444 A | 12/1996 | Burrows |
| 5,582,717 A | 12/1996 | Di Santo |
| 5,587,089 A | 12/1996 | Vogel et al. |
| D378,883 S | 4/1997 | Magnusson |
| 5,626,749 A | 5/1997 | Lambert et al. |
| 5,639,374 A | 6/1997 | Monroe et al. |
| 5,643,444 A | 7/1997 | Garrigues et al. |
| 5,645,719 A | 7/1997 | Ha et al. |
| 5,645,720 A | 7/1997 | Godines |
| 5,656,160 A | 8/1997 | Parise et al. |
| 5,658,457 A | 8/1997 | Schoenmeyr |
| D383,192 S | 9/1997 | Johnson |
| 5,662,779 A | 9/1997 | Greene et al. |
| 5,662,792 A | 9/1997 | Suh |
| 5,665,224 A | 9/1997 | Levene et al. |
| 5,676,824 A | 10/1997 | Jeon et al. |
| 5,679,243 A | 10/1997 | Cho |
| 5,681,459 A | 10/1997 | Bowman |
| D386,242 S | 11/1997 | Clack et al. |
| 5,686,893 A | 11/1997 | Jeon |
| 5,698,091 A | 12/1997 | Kuennen et al. |
| D389,004 S | 1/1998 | Hampshire et al. |
| 5,705,067 A | 1/1998 | Sumi et al. |
| 5,707,518 A | 1/1998 | Coates et al. |
| D390,629 S | 2/1998 | Ullmann |
| 5,715,699 A | 2/1998 | Coates et al. |
| 5,730,863 A | 3/1998 | Howlings et al. |
| 5,755,957 A | 5/1998 | Jeon |
| D395,705 S | 6/1998 | Ediger et al. |
| 5,762,787 A | 6/1998 | Park et al. |
| 5,766,453 A | 6/1998 | Morellato et al. |

| | | | |
|---|---|---|---|
| 5,776,339 A | 7/1998 | Ha et al. |
| 5,785,848 A | 7/1998 | Strand |
| 5,795,475 A | 8/1998 | Luedke et al. |
| D398,367 S | 9/1998 | Andrepont et al. |
| 5,800,707 A | 9/1998 | Mehnert et al. |
| 5,813,245 A | 9/1998 | Coates et al. |
| 5,813,246 A | 9/1998 | Oh |
| 5,817,231 A | 10/1998 | Souza |
| 5,833,849 A | 11/1998 | Primdahl |
| D402,745 S | 12/1998 | Termeer et al. |
| D403,406 S | 12/1998 | Douglas |
| 5,853,572 A | 12/1998 | Kuennen et al. |
| 5,855,796 A | 1/1999 | Joung |
| D405,156 S | 2/1999 | Vanderhoef |
| D405,867 S | 2/1999 | Denkewicz, Jr. et al. |
| D405,868 S | 2/1999 | Denkewicz, Jr. et al. |
| D406,314 S | 3/1999 | Denkewicz, Jr. et al. |
| D407,462 S | 3/1999 | Bishop et al. |
| D409,715 S | 5/1999 | Cruz et al. |
| 5,900,138 A | 5/1999 | Moretto |
| 5,900,141 A | 5/1999 | Takigawa et al. |
| 5,900,143 A | 5/1999 | Dalton et al. |
| D410,726 S | 6/1999 | Cook |
| 5,907,958 A | 6/1999 | Coates et al. |
| 5,922,378 A | 7/1999 | Kagan et al. |
| 5,928,503 A | 7/1999 | Shang-Chun |
| 5,928,506 A | 7/1999 | Bae |
| 5,935,426 A | 8/1999 | Giordano et al. |
| 5,957,339 A | 9/1999 | Deni et al. |
| 5,972,253 A * | 10/1999 | Kimber ................ 264/29.7 |
| D416,307 S | 11/1999 | Williams |
| 5,976,363 A | 11/1999 | Monroe et al. |
| 5,989,425 A | 11/1999 | Yonezawa et al. |
| 5,990,041 A * | 11/1999 | Chung et al. ............. 502/416 |
| 5,992,684 A | 11/1999 | Russell |
| D418,198 S | 12/1999 | Bainton |
| 5,997,734 A | 12/1999 | Koski et al. |
| 6,001,249 A | 12/1999 | Bailey et al. |
| 6,013,180 A | 1/2000 | Wang |
| D421,089 S | 2/2000 | Fujita et al. |
| 6,024,899 A * | 2/2000 | Peng et al. ................ 264/29.1 |
| D422,679 S | 4/2000 | Burrows |
| D424,660 S | 5/2000 | Teran et al. |
| 6,057,262 A * | 5/2000 | Derbyshire et al. ......... 502/423 |
| D426,418 S | 6/2000 | Norvell et al. |
| D429,943 S | 8/2000 | Yu |
| 6,099,735 A | 8/2000 | Kelada |
| 6,120,682 A | 9/2000 | Cook |
| 6,120,683 A | 9/2000 | Reinhart et al. |
| 6,120,685 A | 9/2000 | Carlson et al. |
| 6,123,837 A | 9/2000 | Wadsworth et al. |
| 6,123,844 A | 9/2000 | Haney |
| 6,139,726 A | 10/2000 | Greene |
| 6,177,319 B1 * | 1/2001 | Chen ........................ 438/275 |
| D437,402 S | 2/2001 | Gieseke et al. |
| D437,913 S | 2/2001 | Adam et al. |
| D438,282 S | 2/2001 | Liu |
| D440,255 S | 4/2001 | Dickson |
| 6,228,255 B1 | 5/2001 | Peterson et al. |
| 6,228,803 B1 * | 5/2001 | Gadkaree et al. ............ 502/416 |
| 6,245,229 B1 | 6/2001 | Kool et al. |
| 6,258,265 B1 | 7/2001 | Jones |
| 6,258,266 B1 | 7/2001 | Riback et al. |
| 6,264,830 B1 | 7/2001 | Plester et al. |
| D446,840 S | 8/2001 | Strand |
| 6,270,658 B1 | 8/2001 | Plüss |
| 6,270,822 B1 | 8/2001 | Frazier |
| D449,758 S | 10/2001 | Norvell et al. |
| 6,303,031 B1 | 10/2001 | Senner |
| 6,328,881 B1 | 12/2001 | Larkner et al. |
| 6,337,015 B1 | 1/2002 | Poirier |
| D454,615 S | 3/2002 | Neal |
| 6,361,686 B1 | 3/2002 | Conrad |
| 6,370,884 B1 | 4/2002 | Kelada |
| 6,391,191 B2 | 5/2002 | Conrad |
| 6,402,949 B1 | 6/2002 | Banks |
| 6,423,212 B1 | 7/2002 | Bosko |
| 6,428,687 B1 | 8/2002 | Moretto |
| 6,428,708 B1 | 8/2002 | Halemba et al. |
| 6,436,282 B1 | 8/2002 | Gundrum et al. |
| D465,018 S | 10/2002 | Gustafsson et al. |
| D466,602 S | 12/2002 | Gieseke et al. |
| 6,491,811 B2 | 12/2002 | Conrad et al. |
| 6,491,815 B2 | 12/2002 | Conrad et al. |
| 6,630,016 B2 * | 10/2003 | Koslow ..................... 95/285 |
| 6,881,348 B2 * | 4/2005 | Cannon et al. ............. 210/681 |
| 2001/0032823 A1 | 10/2001 | Plester et al. |
| 2002/0011434 A1 | 1/2002 | Kuennen et al. |
| 2002/0014461 A1 | 2/2002 | Kuennen et al. |
| 2002/0033365 A1 | 3/2002 | Patil |
| 2002/0043491 A1 | 4/2002 | Janik et al. |
| 2002/0060177 A1 | 5/2002 | Conrad |
| 2002/0134714 A1 | 9/2002 | Ozeki et al. |
| 2002/0170618 A1 | 11/2002 | Pluta et al. |
| 2002/0170921 A1 | 11/2002 | Tan et al. |

FOREIGN PATENT DOCUMENTS

| | | |
|---|---|---|
| DE | 3511389 | 5/1985 |
| DE | 3738231 | 5/1989 |
| DE | 3914940 | 11/1990 |
| DE | 4028529 | 3/1992 |
| DE | 4116128 | 11/1992 |
| DE | 19650191 | 8/1998 |
| DE | 19717579 | 10/1998 |
| DE | 10016365 | 10/2001 |
| EP | 0563027 | 6/1994 |
| EP | 0616975 A2 | 9/1994 |
| EP | 0880986 A2 | 12/1998 |
| EP | 0947231 A1 | 10/1999 |
| EP | 0891952 | 6/2000 |
| EP | 1106228 | 6/2001 |
| EP | 0668243 B1 | 9/2001 |
| FR | 2557807 | 7/1985 |
| FR | 2788511 | 7/2000 |
| GB | 191594 | 1/1923 |
| GB | 1202215 | 8/1970 |
| GB | 1470874 | 4/1977 |
| GB | 1546409 | 5/1979 |
| GB | 2 029 255 A | 3/1980 |
| GB | 2238532 A | 6/1991 |
| GB | 2250281 A | 6/1992 |
| GB | 2 257 429 A | 1/1993 |
| GB | 2311775 A | 10/1997 |
| JP | 4-277080 | 10/1992 |
| JP | 10076254 | 3/1998 |
| WO | WO 88/07500 | 10/1988 |
| WO | WO 91/01786 | 2/1991 |
| WO | WO 93/12864 | 1/1992 |
| WO | WO 92/12784 | 8/1992 |
| WO | WO 93/17725 | 9/1993 |
| WO | WO 93/23336 | 11/1993 |
| WO | WO 94/23827 | 10/1994 |
| WO | WO 95/05237 | 2/1995 |
| WO | WO 95/09129 | 4/1995 |
| WO | WO 95/24256 | 9/1995 |
| WO | WO 96/30309 | 10/1996 |
| WO | WO 96/30310 | 10/1996 |
| WO | WO 97/30938 | 8/1997 |
| WO | WO 97/34832 | 9/1997 |
| WO | WO 98/12489 | 3/1998 |
| WO | WO 98/37950 | 9/1998 |
| WO | WO 99/07456 | 2/1999 |
| WO | WO 99/10069 | 3/1999 |
| WO | WO 99/47226 | 9/1999 |
| WO | WO 00/00266 | 1/2000 |

| | | | | | | |
|---|---|---|---|---|---|---|
| WO | WO 00/00437 | 1/2000 | | WO | WO 01/44120 A2 | 6/2001 |
| WO | WO 00/01624 | 1/2000 | | WO | WO 01/74725 | 10/2001 |
| WO | WO 00/01625 | 1/2000 | | WO | WO 02/14228 A2 | 2/2002 |
| WO | WO 00/01626 | 1/2000 | | WO | WO 02/083266 A2 * | 10/2002 |
| WO | WO 00/25887 | 5/2000 | | WO | WO 02/085794 | 10/2002 |
| WO | WO 00/37363 | 6/2000 | | WO | WO 03/022745 | 3/2003 |
| WO | WO 00/43319 | 7/2000 | | | | |
| WO | WO 01/12559 A1 | 2/2001 | | * cited by examiner | | |

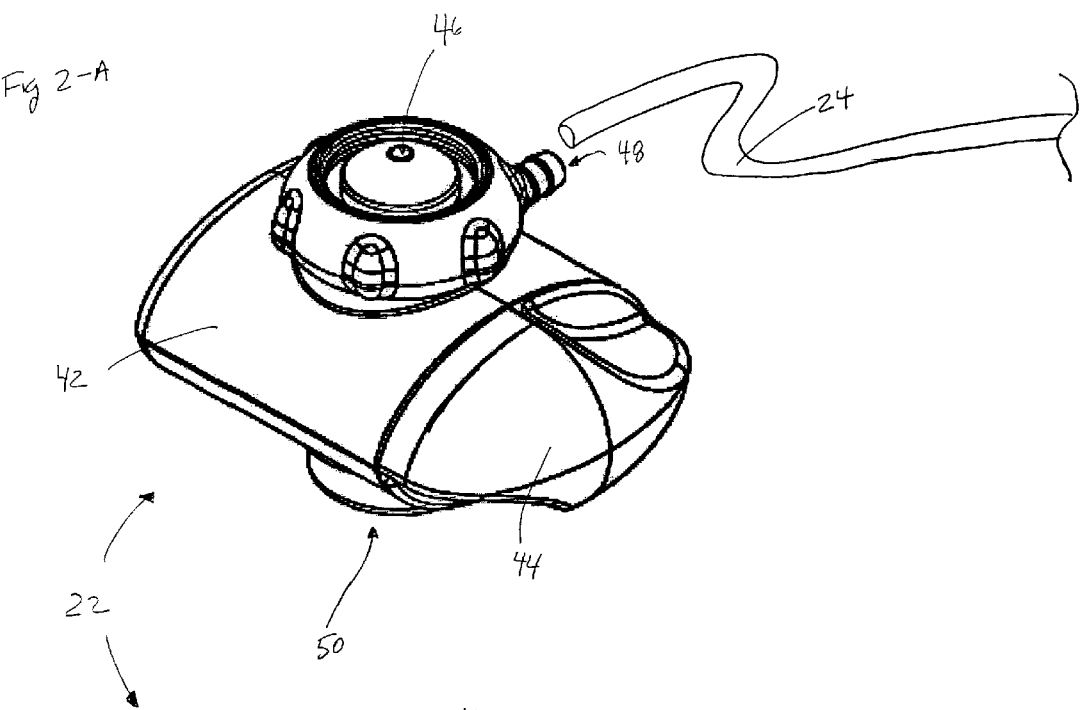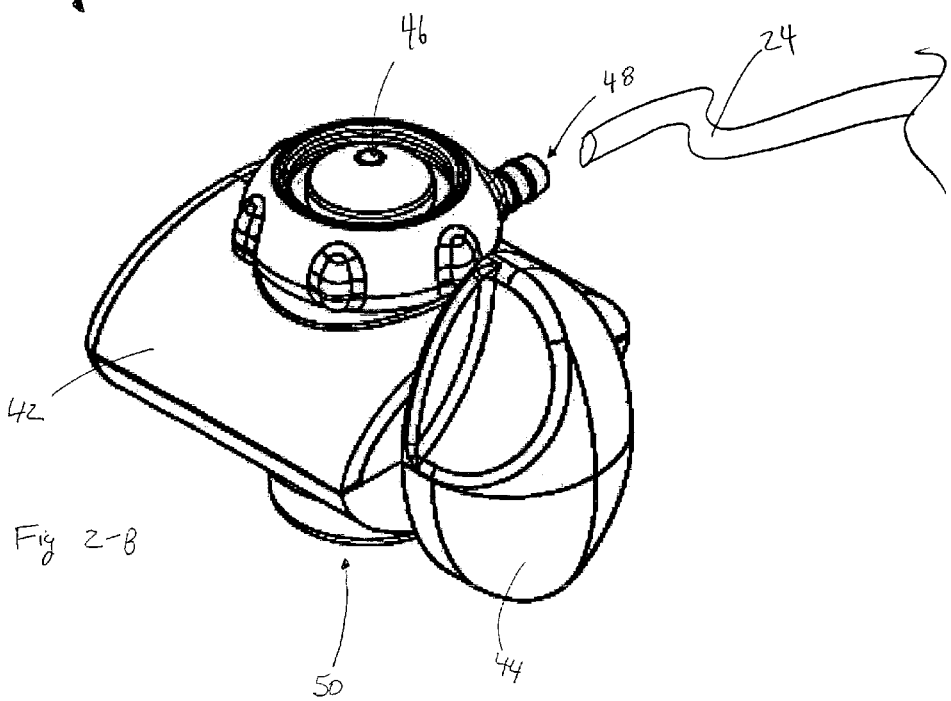

Detail A

WATER FILTER DEVICE

CROSS REFERENCE TO RELATED APPLICATION

Pursuant to 35 U.S.C. § 120, this application is a continuation-in-part of U.S. application Ser. No. 10/464,209, filed on Jun. 18, 2003 now abandoned. U.S. application Ser. No. 10/464,209 is a continuation-in-part of abandoned U.S. application Ser. No. 09/935,962, filed on Aug. 23, 2001 and is a continuation-in-part of abandoned U.S. application Ser. No. 09/935,810, filed on Aug. 23, 2001. Additionally, U.S. application Ser. No. 10/464,209 is a continuation of International Application No. PCT/US 03/05416 designating the U.S., filed Feb. 21, 2003, and is also a continuation of International Application No. PCT/US03/05409 designating the U.S., filed Feb. 21, 2003.

Pursuant to 35 U.S.C. § 120, this application is a continuation-in-part of U.S. application Ser. No. 10/464,210, filed on Jun. 18, 2003. U.S. application Ser. No. 10/464,210 is a continuation-in-part of abandoned U.S. application Ser. No. 09/935,962, filed on Aug. 23, 2001 and is a continuation-in-part of abandoned U.S. application Ser. No. 09/935,810, filed on Aug. 23, 2001. Additionally, U.S. application Ser. No. 10/464,210 is a continuation of International Application No. PCT/US 03/05416 designating the U.S., filed Feb. 21, 2003, and is also a continuation of International Application No. PCT/US 03/05409 designating the U.S., filed Feb. 21, 2003.

Pursuant to 35 U.S.C. § 120, this application is a continuation-in-part of abandoned U.S. application Ser. No. 09/935,962, filed on Aug. 23, 2001 and is a continuation-in-part of abandoned U.S. application Ser. No. 09/935,810, filed on Aug. 23, 2001.

Pursuant to 35 U.S.C. § 120, this application is a continuation-in-part of International Application No. PCT/US 03/05416 designating the U.S., filed Feb. 21, 2003, and is also a continuation-in-part of International Application No. PCT/US 03/05409 designating the U.S., filed Feb. 21, 2003.

The substances of these priority references are incorporated herein by reference.

FIELD OF THE INVENTION

A water treatment device for treating untreated drinking water.

BACKGROUND OF THE INVENTION

Water may contain many different kinds of contaminants including, for example, particulates, harmful chemicals, and microbiological organisms, such as bacteria, parasites, protozoa, and viruses. In a variety of circumstances, these contaminants must be removed before the water can be used. Any harmful contaminants must be removed from water before it is potable, i.e., fit to consume.

In non-developed countries, there are deadly consequences associated with exposure to contaminated water. At the same time, there are several factors that contribute to contaminated water, including: increasing population densities, increasingly scarce water resources, no water filter utilities, and often, no electricity (including the batteries which are too expensive). In some instances, homes that are next to one another in the same geography may have large variances in the pressure of untreated drinking water available to them. Also, it is common for sources of drinking water to be in close proximity to human and animal waste, such that microbiological contamination is a major health concern. As a result of waterborne microbiological contamination, an estimated six million people die each year, half of which are children under 5 years of age.

In 1987, the U.S. Environmental Protection Agency (EPA) introduced the "*Guide Standard and Protocol for Testing Microbiological Water Purifiers*". The protocol establishes minimum requirements regarding the performance of drinking water filter devices that are designed to reduce specific health related contaminants in public or private water supplies. The requirements are that the effluent from a water supply source exhibits 99.99% (or equivalently, 4 log) removal of viruses and 99.9999% (or equivalently, 6 log) removal of bacteria against a challenge. Under the EPA protocol, in the case of viruses, the influent concentration should be $1 \times 10^7$ viruses per liter, and in the case of bacteria, the influent concentration should be $1 \times 10^8$ bacteria per liter. Because of the prevalence of *Escherichia coli* (*E. coli*, bacterium) in water supplies, and the risks associated with its consumption, this microorganism is used as the bacterium in the majority of studies. Similarly, the MS-2 bacteriophage (or simply, MS-2 phage) is typically used as the representative microorganism for virus removal because its size and shape (i.e., about 26 nm and icosahedral) are similar to many viruses. Thus, a filter's ability to remove MS-2 bacteriophage demonstrates its ability to remove other viruses.

Thus, some of the challenges include, providing a water filter device that can provide the average household with an adequate daily supply of potable water for drinking and cooking when untreated drinking water is contaminated with viruses and bacteria, water is scarce, electricity and batteries are not available, when there are great variances in water pressure within common geographies, when there are periods of no water pressure.

SUMMARY

A water filter device for treating untreated drinking water comprising a connector for providing fluid communication between the water filter device and an untreated drinking water source. The water filter device may comprise a low-pressure water filter in fluid communication with the connector. The water filter may comprise a water filter material. The water filter may comprise a F-BLR of greater than about 2 logs. The water filter device may comprise a storage housing in fluid communication with the low-pressure water filter. The water filter device may comprise an automatic shutoff valve in fluid communication with the storage housing. The water filter device may comprise a dispenser in fluid communication with the storage housing. The treated drinking water may enter into the storage housing at the rate of at least about 5 mL/min but not greater than about 2,000 mL/min until activating the automatic shutoff valve, such that the flow of treated drinking water into the storage housing is arrested. The water filter device may be a non-electric water filter device.

A method of treating low-pressure untreated drinking water may comprise providing a low-pressure water filter device. The low-pressure water filter device may comprise a connector for connecting to an untreated drinking water source. A low-pressure water filter may comprise mesoporous activated carbon particles and a storage housing. The method may further comprise running low-pressure untreated drinking water from a source of low-pressure untreated drinking water through the low-pressure water filter. The low-pressure untreated drinking water may comprise viruses and bacteria, such that the average fluid contact time is greater than about 2 seconds. The water filter may comprise a F-BLR of greater than about 2 logs and a F-VLR of greater than about 1 log. The method may further comprise filling a storage housing with treated drinking water at greater than about 5 mL/min.

A method of incorporating a modular water filter device for treating untreated drinking water. The method may comprise providing a modular water filter device unit. The modular water filter device unit may comprise a low-pressure water filter for treating untreated drinking water. The low-pressure water filter may comprise a water filter material and an automatic shutoff valve for arresting the flow of treated drinking water. The method may further comprise incorporating the modular water filter device into a storage housing for storing treated drinking water. The modular water device unit may be a non-electric water filter device.

BRIEF DESCRIPTION OF THE DRAWINGS

FIG. 2-A is a perspective view of the connector of the water filter device of FIG. 1 in the "open position", and a partial view of a connector hose of the water filter device of FIG. 1.

FIG. 2-B is a perspective view of a connector of the water filter device of FIG. 1 in the "closed position", and a partial view of a connector hose of the water filter device of FIG. 1.

DETAILED DESCRIPTION

I. Definitions

Figure 1:
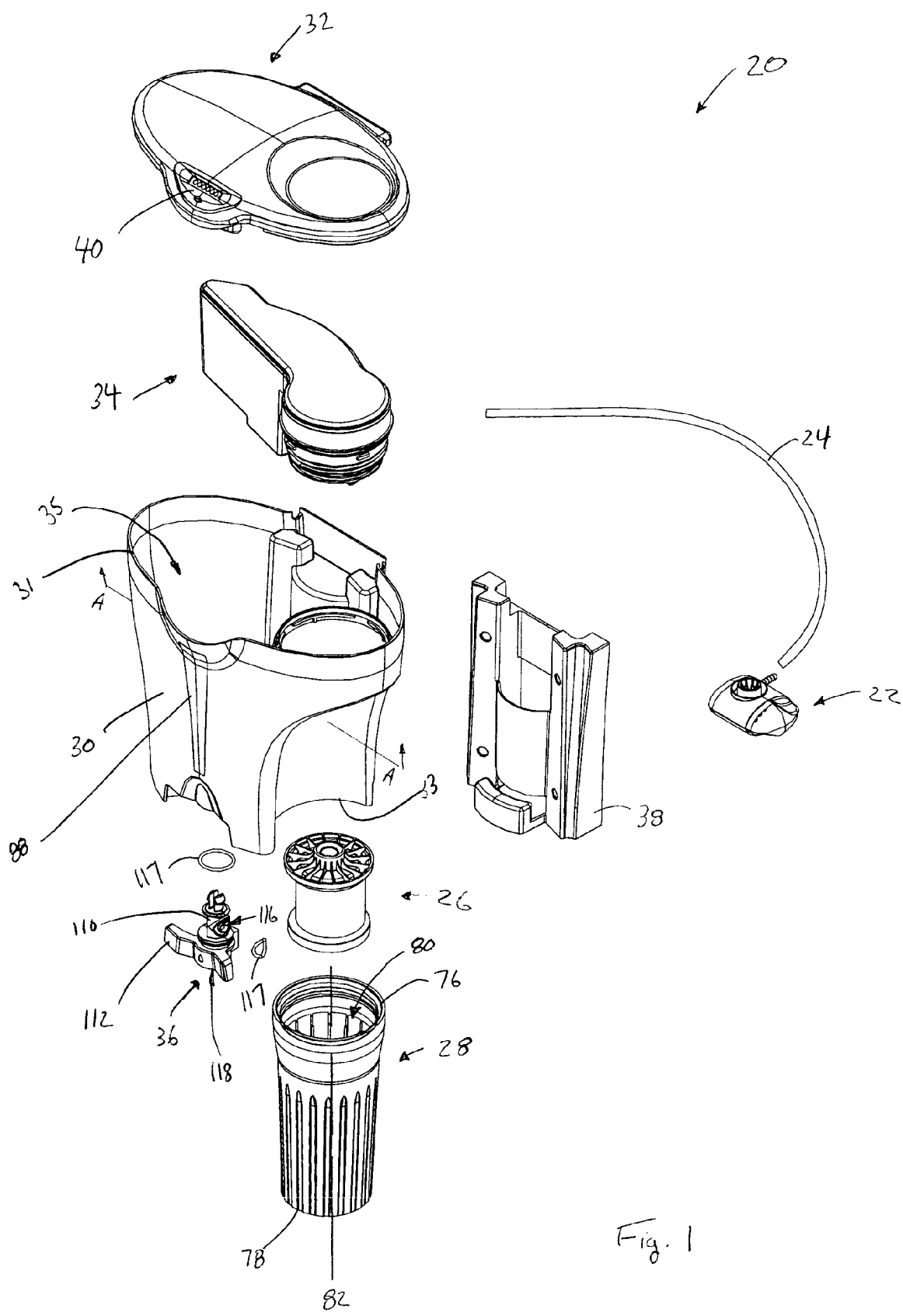
FIG. 1 is an exploded perspective view of a water filter device.

As used herein, the phrase "activated carbon particles" and their derivatives are intended to refer to carbon particles that have been subjected to a process in which a carbonized substance is rendered more porous.

As used herein, the term "activation" and its derivatives are intended to refer to a process in which a carbonized substance is rendered more porous.

As used herein, the term "activated carbon particles" or "activated carbon filter particles" and their derivatives are intended to refer to carbon particles that have been subjected to an activation process.

As used herein, the phrases "average fluid residence time" and/or "average fluid contact time" refer to the average time that the fluid is in contact with the filter particles inside the filter as it travels through the filter material, and are calculated as the ratio of the filter material pore volume to the fluid flow rate.

As used herein, the phrase "axial flow" refers to flow through a planar surface and perpendicularly to that surface.

As used herein, the term "basic" is intended to refer to filter particles with a point of zero charge greater than 7.

As used herein, the term "disposable" means a filter designed and manufactured for treating of from about 50 to about 200 gallons of untreated drinking water, or treating from about 30 days to about 120 days.

As used herein, the phrase "face area" refers to the area of the filter material initially exposed to the influent water. For example, in the case of axial flow filters, the face area is the cross sectional area of the filter material at the entrance of the fluid, and in the case of the radial flow filter, the face area is the outside area of the filter material.

As used herein, the phrase "Filter Bacteria Log Removal (F-BLR)" refers to the bacteria removal capability of the filter after the flow of the first 2,000 filter material pore volumes. The F-BLR is defined and calculated as:

F-BLR=−log [(effluent concentration of $E.\ coli$)/(influent concentration of $E.\ coli$)], where the "influent concentration of $E.\ coli$" is set to about $1\times10^8$ CFU/L continuously throughout the test and the "effluent concentration of $E.\ coli$" is measured after about 2,000 filter material pore volumes flow through the filter. F-BLR has units of "log" (where "log" is the logarithm). Note that if the effluent concentration is below the limit of detection of the technique used to assay, then the effluent concentration for the calculation of the F-BLR is considered to be the limit of detection. Also, note that the F-BLR is measured without application of chemical agents that provide bactericidal effects.

As used herein, the phrase "filter material depth" refers to the linear distance that the influent water travels from the entrance to the exit of the filter material. For example, in the case of axial flow filters, the filter depth is the thickness of the filter material, and in the case of the radial flow filter, the filter depth is half of the difference between the outside and inside diameters of the filter material.

As used herein, the phrase "filter material pore volume" refers to the total volume of the inter-particle pores in the filter material with sizes larger than 0.1 μm.

As used herein, the phrase "filter material total volume" refers to the sum of the inter-particle pore volume and the volume occupied by the filter particles.

As used herein, the phrase "filter particle" is intended to refer to an individual member or piece, which is used to form at least part of a filter material. For example, a fiber, a granule, a bead, etc. are each considered filter particles herein.

As used herein, the phrases "filter porosity" and/or "filter bed porosity" refer to the ratio of the filter material pore volume to the filter material total volume.

As used herein, the phrase "Filter Viruses Log Removal (F-VLR)" refers to the virus removal capability of the filter after the flow of the first 2,000 filter material pore volumes. The F-VLR is defined and calculated as:

F-VLR=−log [(effluent concentration of MS-2)/(influent concentration of MS-2)], where the "influent concentration of MS-2" is set to about $1\times10^7$ PFU/L continuously throughout the test and the "effluent concentration of MS-2" is measured after about 2,000 filter material pore volumes flow through the filter. F-VLR has units of "log" (where "log" is the logarithm). Note that if the effluent concentration is below the limit of detection of the technique used to assay, then the effluent concentration for the calculation of the F-VLR is considered to be the limit of detection. Also, note that the FVLR is measured without application of chemical agents that provide virucidal effects.

As used herein, the term "low-pressure" means from about 1 pound per square inch (herein, "psi") to about 20 psi.

As used herein, the term "low-pressure water filter" means a water filter which delivers from about 5 milliliters/minute (herein "mL/min") to about 400 mL/min of treated drinking water when the source of untreated drinking water is at a pressure of at least about 1 psi.

As used herein, the term "macropore" is intended to refer to an intra-particle pore having a width or diameter greater than 50 nm (or equivalently, 500 Å).

As used herein, the term "mesopore" is intended to refer to an intra-particle pore having a width or diameter between 2 nm and 50 nm (or equivalently, between 20 Å and 500 Å).

As used herein, the term "low-pressure water filter device" means a water filter device that delivers at least about 5 mL/min to about 400 mL/min of treated drinking water when the source untreated drinking water is at a pressure of at least about 1 psi.

As used herein, the phrase "mesoporous activated carbon filter particle" refers to an activated carbon filter particle wherein the sum of the mesopore and macropore volumes may be greater than 0.12 milliliters/gram (herein "mL/g").

As used herein, the phrase "mesoporous and basic activated carbon filter particle" is intended to refer to an activated carbon filter particle wherein the sum of the mesopore and macropore volumes may be greater than 0.12 mL/g and has a point of zero charge greater than 7.

As used herein, the phrase "mesoporous, basic, and reduced-oxygen activated carbon filter particle" is intended to refer to an activated carbon filter particle wherein the sum of the mesopore and macropore volumes may be greater than 0.12 mL/g, has a point of zero charge greater than 7, and has a bulk oxygen percentage by weight of 1.5% or less.

As used herein, the terms "microorganism", "microbiological organism" and "pathogen" are used interchangeably. These terms refer to various types of microorganisms that can be characterized as bacteria, viruses, parasites, protozoa, and germs.

As used herein, the term "micropore" is intended to refer to an intra-particle pore having a width or diameter less than 2 nm (or equivalently, 20 Å).

As used herein, the phrase "micropore volume" and its derivatives are intended to refer to the volume of all micropores. The micropore volume is calculated from the volume of nitrogen adsorbed at a relative pressure of 0.15 using the Brunauer, Emmett and Teller (herein "BET") process (ASTM D 4820-99 standard), a process well known in the art.

As used herein, the term "non-electric water filter device" means a water filter device that does not use alternating or direct current to increase water pressure.

As used herein, the phrase "point of zero charge" is intended to refer to the pH above which the total surface of the carbon particles is negatively charged. A well known test procedure for determining the point of zero charge is set forth hereafter.

As used herein, the phrase "pore size distribution in the mesopore range" is intended to refer to the distribution of the pore size as calculated by the Barrett, Joyner, and Halenda (BJH) process, a process well known in the art.

As used herein, the phrase "radial flow" typically refers to flow through essentially cylindrical or essentially conical surfaces and perpendicularly to those surfaces.

As used herein, the phrase "sum of the mesopore and macropore volumes" and its derivatives are intended to refer to the volume of all mesopores and macropores. The sum of the mesopore and macropore volumes is equal to the difference between the total pore volume and micropore volume, or equivalently, is calculated from the difference between the volumes of nitrogen adsorbed at relative pressures of 0.9814 and 0.15 using the BET process (ASTM D 4820-99 standard), a process well known in the art.

As used herein, the term "self-filling" means a water filter device that stops treating untreated drinking water automatically once a storage housing is filled to a predetermined level.

As used herein, the phrase "specific external surface area" is intended to refer to the total external surface area per unit mass of the filter particles, as discussed more fully hereafter.

As used herein, the phrase "total external surface area" is intended to refer to the total geometric external surface area of one or more of the filter particles, as discussed more fully hereafter.

As used herein, the term "untreated" means water that has not been treated using the water filter device described herein.

As used herein, the term "water filter" or "filter" refers to structures and mechanisms, respectively for removal or neutralization of contaminants by, for example, one or a combination of size exclusion, electrolysis, absorption, adsorption, oxidation, reduction, chemical disinfection, ion exchange, etc.

As used herein, the phrase "water filter material" or "filter material" is intended to refer to an aggregate of filter particles. The aggregate of the filter particles forming a filter material can be either homogeneous or heterogeneous. The filter particles can be uniformly or non-uniformly distributed (e.g., layers of different filter particles) within the filter material. The filter particles forming a filter material also need not be identical in shape or size and may be provided in either a loose or interconnected form.

II. Water Filter Device

Numerals with the same last three digits represent the same or similar elements throughout the figures (e.g., 122, 1122, 2122, or 020, 1020, 2020).

As shown in FIG. 1, an embodiment of the invention may be a water filter device 20 that may comprise a connector 22 for connecting to an untreated drinking water source, a connector hose 24 for placing the connector 22 and the control head 34 in fluid communication, a water filter 26 for treating untreated drinking water, a filter vessel 28 for containing the water filter 26, a storage housing 30 for storing treated drinking water treated by the water filter 26, a storage housing cover 32 for covering the storage housing 30, a dispenser 36 for dispensing the treated drinking water stored in the storage housing 30, a wall-mount bracket 38 for mounting the water filter device 20, a flow regulator 39 (shown in FIG. 5) for controlling the flow of drinking water through the water filter device 20, and/or a life display 40 for displaying the life of the water filter 26.

A. The Hose

As shown in FIG. 1, the connector hose 24 may fluidly connect the connector 22 to the control head 34. The connector hose 24 may be various lengths and diameters. The connector hose 24 may be made from one or more of a variety of materials, including, but not limited to, one or a combination of plastics, etc.

B. The Connector

As shown in FIGS. 2-A and 2-B, the connector 22 may comprise a connector body 42, a connector handle 44, a valve, a connector inlet 46, a first connector outlet 48, and a second connector outlet 50. The connector inlet 46 may be releasably (e.g., friction fitted, threadably fitted, bolted, screwed, fastened, snap fitted, latched, etc.) or permanently (e.g., molded, adhesively bonded, soldered, welded, hot plate welded, etc.) connected to an untreated drinking water source (e.g., a residential-type water faucet, in-line under a sink, a roof-mounted tank, etc.) for introducing untreated drinking water into the water filter device 20. The first connector outlet 48 may be connected to the connector hose 24. The second connector outlet 50 may also be threaded for attachment of an aerator, a quick disconnect fitting for a dishwasher, etc. The connector handle 44 may be used to direct (by turning it 90 degrees) the flow of untreated drinking water, such that the user may choose between the immediate use of untreated drinking water through the second connector outlet 50 (the "open position" shown in FIG. 2-A), or treating untreated drinking water through the first connector outlet 48 (the "closed position" shown in FIG. 2-B).

The connector 22 may be made from one or more of a variety of materials, including, but not limited to, one or a combination of plastics, metal and alloys thereof, fiberglass, etc.

C. The Water Filter

Figure 3:
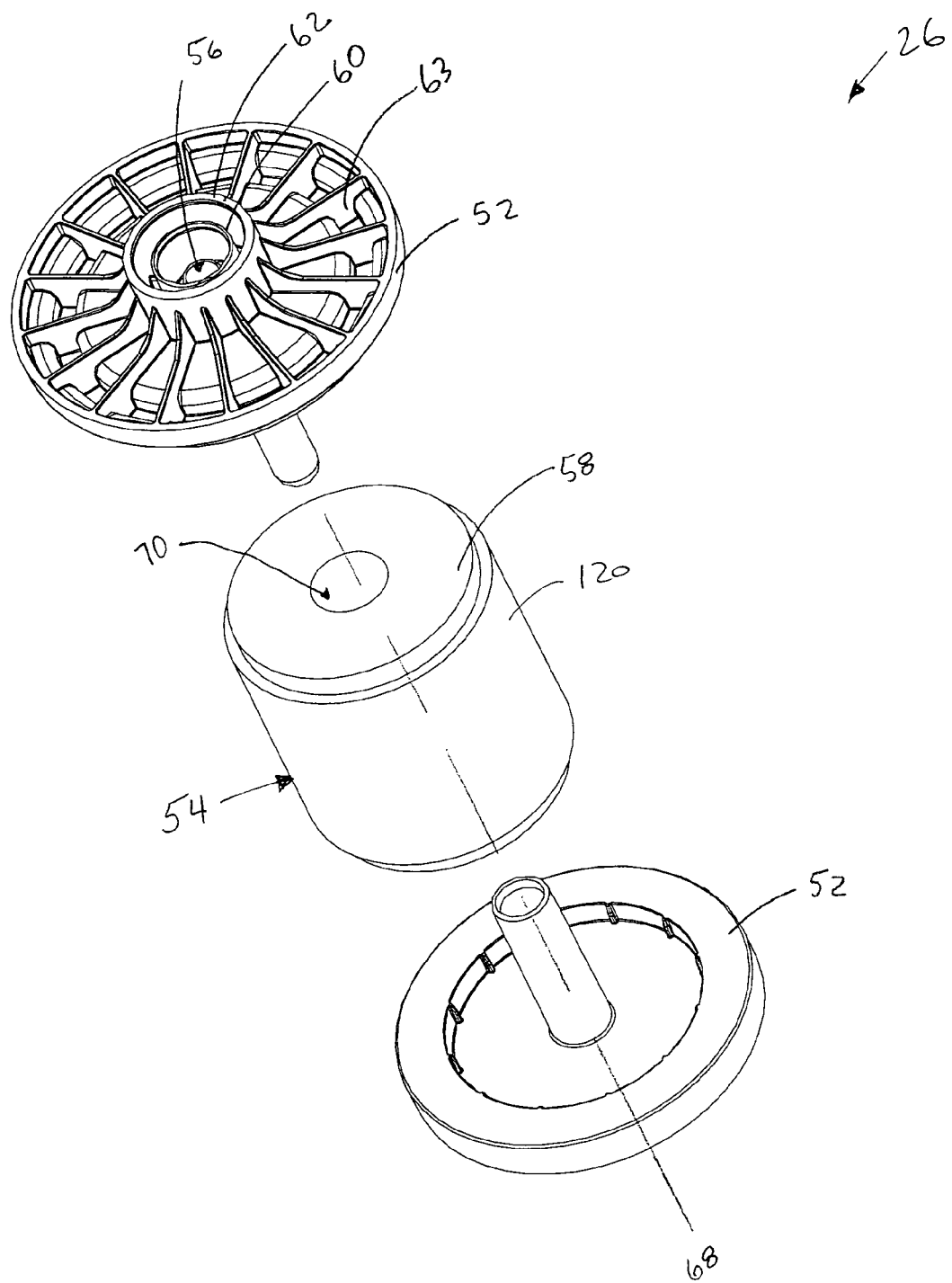
FIG. 3 is an exploded perspective view of the water filter of the water filter device of FIG. 1.

As shown in FIG. 3, the water filter 26 may comprise a filter housing 52, a filter inlet 54, a filter outlet 56, and a water filter material 58. Further, as described in U.S. patent application Ser. No. 60/473,271, the water filter 26 may have a first tube 60, second tube 62 (which may be supported by ribs 63), and third tube 64 (explained in more detail below, See FIG. 6).

The filter housing 52 may cap the end portions of the water filter material 58. The filter housing 52 may be cylindrical, however, it may be various shapes and sizes. The filter housing 52 may be made from one or more of a variety of materials, including, but not limited to, one or a combination of plastics, metal and alloys thereof, fiberglass, etc. Alternatively, the filter housing 52 may form a well-defined compartment that holds a water filter material 58.

The filter inlet 54 may be a portion of exposed water filter material 58 (e.g., a portion of a carbon block), or a pre-filter 120, capped by the filter housing 52 at both ends. That is, water may enter the water filter 26 through the exposed portion of the water filter material 58 or the pre-filter 120.

The filter outlet 56 may be a circular opening, concentric and coaxial with the longitudinal axis 68 of the water filter 26. The filter inlet 54 and filter outlet 56 may be of varying size and oriented in any manner that best serves the application. Thus, the filter inlet 54 and filter outlet 56 can be oriented in the same proximity (e.g., sharing the same opening), in near proximity (e.g., sharing the same surface or end), or in distant proximities from one another (e.g., located at opposite ends).

The water filter material 58 may be contained within the filter housing 52. The water filter material 58 may be in the form of a block, wherein the block of water filter material 58 may have a core region 70.

Examples of the water filter material 58 are described in U.S. Pat. Nos. 2,167,225, 2,335,458, 4,172,796, 4,493,772, 4,764,274, 4,025,438, 4,094,779, 5,679,248, 6,274,041, 6,337,015, and U.S. patent application Nos. 09/935,810, 09/935,962, 09/628,632, 09/832,581, 09/832,580, 09/736,749, 09/574,456, 09/564,919, and 09/347,223. For example, the water filter material may include, but is not limited to, one or a combination of carbon (e.g., activated carbon, including basic mesoporous wood activated carbon, such as a tube of porous carbon, or a block of porous carbon, or carbon powder or particles sintered with a plastic binder or the like), ion exchange material (e.g., in the form of resin beads, flat filtration membranes, fibrous filtration structures, etc.), zeolite particles or coatings (e.g., silver loaded), polyethylene, or charge-modified melt-blown or micro-fiber glass webs, alumina, diatomaceous earth, etc.

The water filter material 58 may comprise from about 7 grams (herein, "g") to about 600 g, from about 15 g to about 300 g, or from about 30 g to about 170 g of activated carbon particles (as described in U.S. application Ser. Nos. 10/464,210, and 10/464,209) to treat low-pressure untreated drinking water. The activated carbon particles may have a bulk density from about 0.2 g/mL to about 0.8 g/mL, from about 0.3 g/mL to about 0.7 g/mL, or from about 0.35 g/mL to about 0.65 g/mL. Activated carbon may be formed into blocks by processes described in U.S. Pat. Nos. 4,664,673; 4,859,386; 5,019,311; 5,189,092; 5,249,948; 5,679,248; 5,679,248; 5,928,588; 5,976,432; and WO 98/43796 according to the following activated carbon block specifications:

Flow Rate:
From about 5 mL/min to about 100 mL/min/inch of block length at 10 psi.

Target Fill Time:
From about 20 minutes to about 10 hours for 3,000 mL of treated drinking water at 10 psi.

Dimensions:
Block Length: From about 2 inches to about 6 inches.
Outer Diameter: From about 1.5 inches to about 4 inches.
Inner Diameter: From about 0.3 inches to about 1 inch.

Minimum Average Fluid Contact Time:
At least about 3 seconds.

A water filter material 58 comprising activated carbon particles may enable the water filter device 20 to treat about 100% of all the untreated drinking water that enters the water filter device 20 via the connector 22. The only water that may be wasted (that is, which enters the water filter device 20 and is not treated) is that water which may remain in the connector 22, connector hose 24, and filter vessel 28 when the filter vessel 28 is removed for changing of the water filter 26 (the wasted water may be less than about 0.5% when compared to the volume of untreated drinking water treated by the water filter 26 over its life). Thus, about all (100%) of the untreated drinking water which enters the water filter device 20 via said connector 22 is made available for drinking from the storage housing 30.

As mentioned above, the water filter 26 may further comprise a pre-filter 120. The pre-filter 120 may prevent clogging of the filter material 58, especially in geographies where there is a high level of particulate or organic contamination (including bacteria slime). The pre-filter 120 may include, but is not limited to, one or a combination of melt-blown polypropylene, non-woven polymer, micro-glass fiber, non-woven cellulose filter material, etc. The pre-filter 120 may be one or multiple layers.

The water filter 26 may have an F-BRL greater than about 2 logs, greater than about 3 logs, greater than about 4 logs, and greater than about 6 logs, and an F-VRL may be greater than about 1 log, greater than about 2 logs, greater than about 3 logs, and greater than about 4 logs. Further, the water filter 26 may, in addition to above-said FBRL/F-VRL, have an output from about 5 mL/min to about 2,000 mL/min, from about 25 mL/min to about 1,000 mL/min, or from about 50 mL/min to about 400 mL/min when treating low-pressure untreated drinking water.

(i) Water Filter Material Example 1

About 18.3 g of Nuchar® RGC mesoporous and basic activated carbon powder (with $D_{v,0.5}$ equal to about 45 μm) from MeadWestvaco Corp. of Covington, Va., is mixed with about 7 g of Microthene® low-density polyethylene (LDPE)

FN510-00 binder of Equistar Chemicals, Inc. of Cincinnati, Ohio, and about 2 g of Alusil® 70 aluminosilicate powder from Selecto, Inc., of Norcross, Ga. The mixed powders are then poured into a circular aluminum mold with about 3 in. (about 7.62 centimeters (herein, "cm")) internal diameter and about 0.5 in. (about 1.27 cm) depth. The mold is closed and placed in a heated press with platens kept at about 204° C. for 1 h. Then, the mold is allowed to cool to room temperature, opened, and the axial flow filter is removed. The characteristics of the filter are: face area: about 45.6 centimeters squared (herein "cm$^2$"); filter depth: about 1.27 cm; filter total volume: about 58 mL; filter porosity (for pores greater than about 0.1 nanometers (herein "µm"): about 0.43; and filter material pore volume (for pores greater than about 0.1 µm): about 25 mL (as measured by mercury porosimetry).

(ii) Water Filter Material Example 2

About 26.2 g of coconut microporous and basic activated carbon powder (with $D_{v,0.5}$ equal to about 92 µm) is mixed with 7 g of Microthene® low-density polyethylene (LDPE) FN510-00 binder of Equistar Chemicals, Inc. of Cincinnati, Ohio, and about 2 g of Alusil® 70 aluminosilicate powder from Selecto, Inc., of Norcross, Ga. The mixed powders are then poured into a circular aluminum mold with about 3 in. (about 7.62 cm) internal diameter and about 0.5 in. (about 1.27 cm) depth. The mold is closed and placed in a heated press with platens kept at about 204° C. for 1 h. Then, the mold is allowed to cool to room temperature, is opened, and the axial flow filter is removed. The characteristics of the filter are: face area: about 45.6 cm$^2$; filter depth: about 1.27 cm; filter total volume: about 58 mL; filter porosity (for pores greater than about 0.1 µm): about 0.44; and filter material pore volume (for pores greater than about 0.1 µm): about 25.5 mL (as measured by mercury porosimetry).

D. The Filter Vessel

Figure 5:
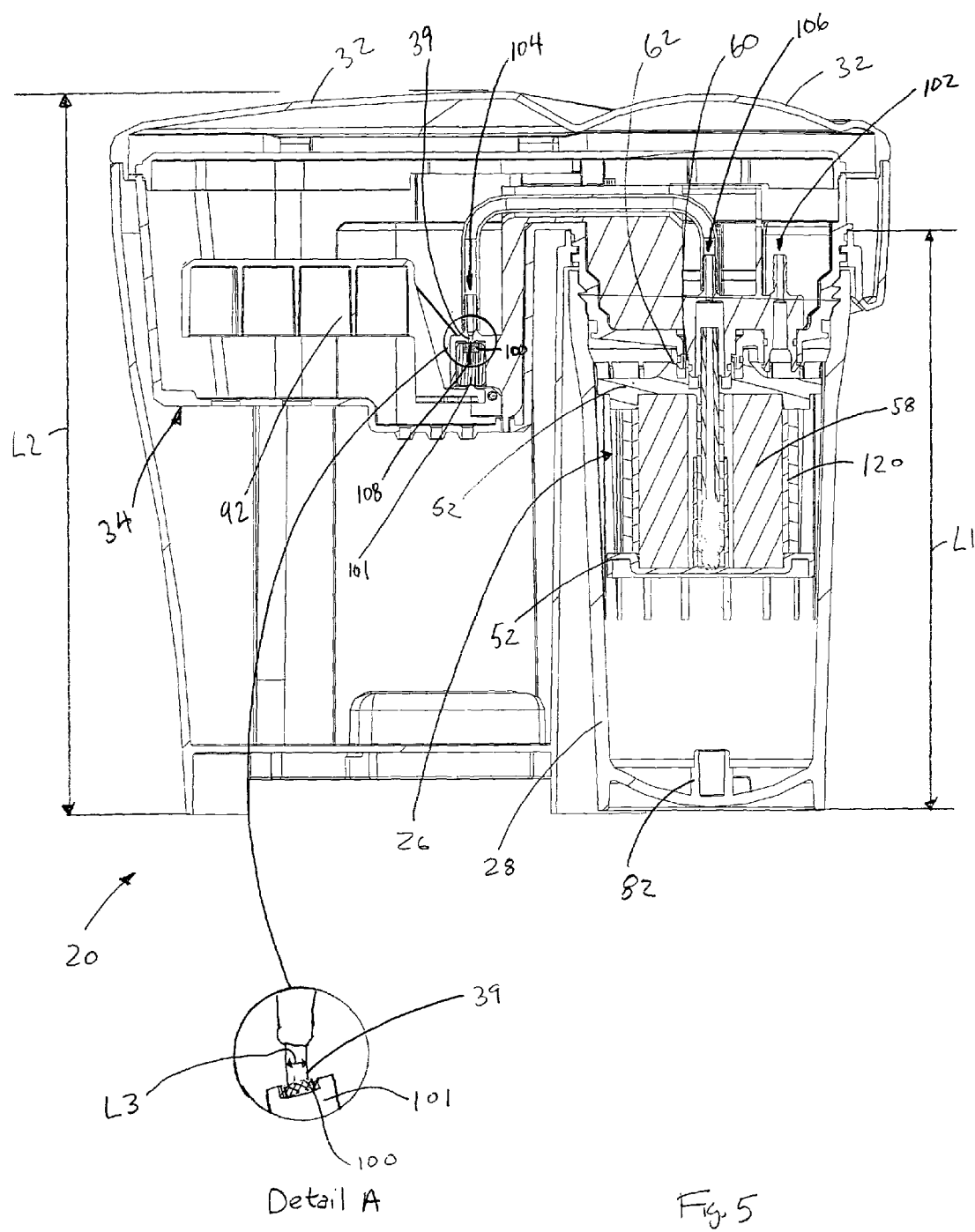
FIG. 5 is a cross-sectional side view of the water filter device of FIG. 1 taken along the line A-A, wherein the flow regulator is detailed as Detail-A.

As shown previously in FIG. 1, the filter vessel 28 may be shaped for surrounding the water filter 26 (which may be connected to the control head 34, as shown in FIG. 5, and as described in U.S. application Ser. No. 60/473,271) and for releasably connecting (e.g., friction fitted, threadably fitted, bolted, screwed, fastened, snap fitted, latched, etc.) and fluidly sealing to the control head 34, or other part of the water filter device 20, such that the filter vessel 28 may be in fluid communication with the control head 34. O-rings, u-cups, other elastomeric seals or gaskets, etc. (not shown) may be used to achieve a fluid seal. The filter vessel 28 may be "easy-to-open", such that the average adult is able to connect and disconnect it from the control head 34 using only their hands (that is, without any tools), such that only from about 5 inch-pounds (herein, "inch-lbs") to about 100 inch-lbs, from about 7 inch-lbs to about 50 inch-lbs, or from about 10 inch-lbs to about 30 inch-lbs of torque is required to open it. Alternatively, the filter vessel 28 may be fully or partially released from the water filter device 20 via actuation of a button (not shown), such that the button releases a latch (not shown) or a tab (not shown) which holds the filter vessel 28 in an attached orientation to the water filter device 20. The button may alternatively impact or cause the impact of the filter vessel 28 such that it clears the latch or tab.

The filter vessel 28 may be shaped like a capsule, having an open first end 76, a closed second end 78, and an interior volume 80. The filter vessel 28 may be made from one or more of a variety of materials, including, but not limited to, one or a combination of plastics, metal and alloys thereof, fiberglass, etc.

Figure 4:
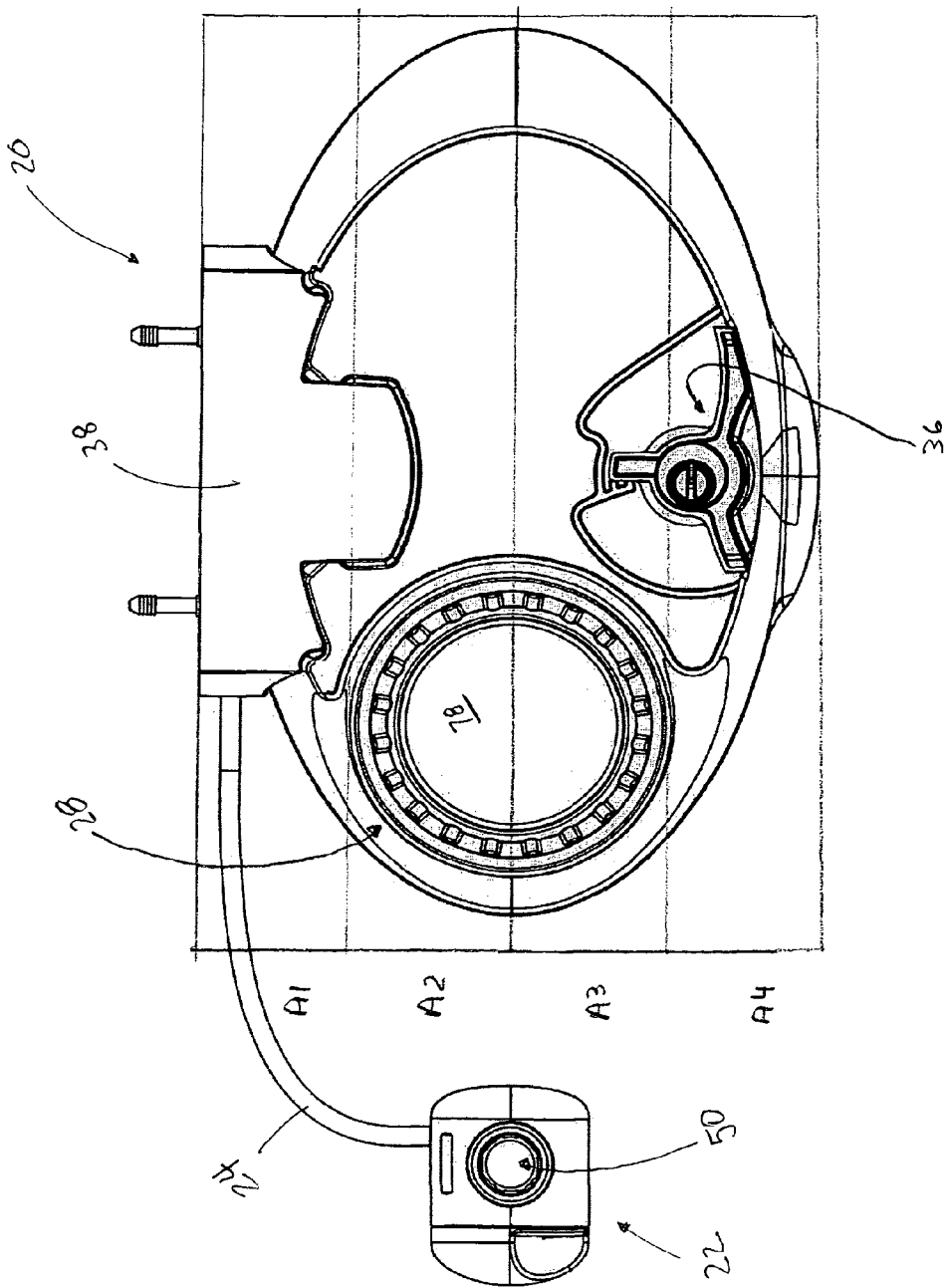
FIG. 4 is a bottom plan view of the water filter device of FIG. 1

The filter vessel 28 may have a longitudinal axis 82, and may be vertically oriented when connected to the control head 34. Further, as shown in FIG. 4, the filter vessel 28 may be oriented in the front portion and/or a combination of the front and side portions, Areas A2, A3, and A4 (that is, about the front 75% of the water filter device 20) versus the back portion, Area A1 (that is, about the back 25% of the water filter device 20).

Being front or side orientated, and/or easy-to-open may increase user compliance with changing the water filter 26. Additionally, the fewer elements that the user has to take apart to change the water filter 26, the less chance there is of contamination of the internal parts of the water filter device 20. When the filter vessel 28 is front and/or side oriented and easy-to-open, it may be attached and/or removed, and the filter 26 may be changed, such that the water filter device 20 may remain in the same position as it is when being used by the user (which may normally be with the dispenser 36 toward the user, and may include the water filter device 20 being wall-mounted or set on a countertop).

The interior volume of the filter vessel 28 may be from about 75 milliliters (herein, "mL") to about 3,000 mL, from about 150 mL to about 2,000 mL, or from about 300 mL to about 1,500 mL. As shown in FIG. 5, the distance L1, the height of the filter vessel 28, may be about 5 centimeters (herein, "cm") to about 75 cm, from about 7 cm to about 50 cm, or from about 10 cm to about 25 cm. The diameter of the filter vessel 28 may be about 2 cm to about 40 cm, from about 4 cm to about 20 cm, or from about 6 cm to about 12 cm.

The height of the filter vessel 28 (or water filter 26 in the case the filter housing 52 is used as a filter vessel 28) may be less than 75%, less than 50%, or less than 25% of the height of the water filter device 20 (the distance L2, the height of the water filter device 20, may be from about 5 cm to about 80 cm, from about 10 cm to about 40 cm, or from about 20 cm to about 30 cm). Thus, if the water filter device 20 is set on a planar surface (e.g., a countertop), the bottom of the filter vessel 28 (or water filter 26 in the case the filter housing 52 is used as a filter vessel 28) may be from about 1 mm to about 70 mm, from about 3 mm to about 50 mm, or from about 5 mm to about 25 mm from the planar surface, such that the filter vessel 28 (or water filter 26 in the case the filter housing 52 is used as a filter vessel 28) may be easily removed from the water filter device 20.

Alternatively, as described in U.S. patent application Ser. No. 10/424,200, the filter vessel 28 may completely encase the water filter 26 such that the water filter 26 physically connects to the filter vessel 28, and the filter vessel 26 physically connects to the control head 34 placing the filter vessel 26 and the water filter 26 in fluid communication with the control head 34. Such a filter vessel 26 may, instead of having an open first end 76, have one or more smaller openings which place it in fluid communication with the control head 34.

Alternatively, the filter housing 52 may be used as a filter vessel 28 (such that the filter housing 52 encases, rather than caps, the filter material 58, such that the filter housing 52 releasably connects (e.g., friction fitted, threadably fitted, bolted, screwed, fastened, snap fitted, latched, etc.) and fluidly seals to the control head 34, or other part of the water filter device 20, such that the water filter 26 may be in fluid communication with the control head 34. In such an application, the filter vessel 28 may be disposable. Disposable filter vessels 28 may not be practical in economically depressed geographies as cost of water filter device 20 use is often increased by such use.

Figure 6:
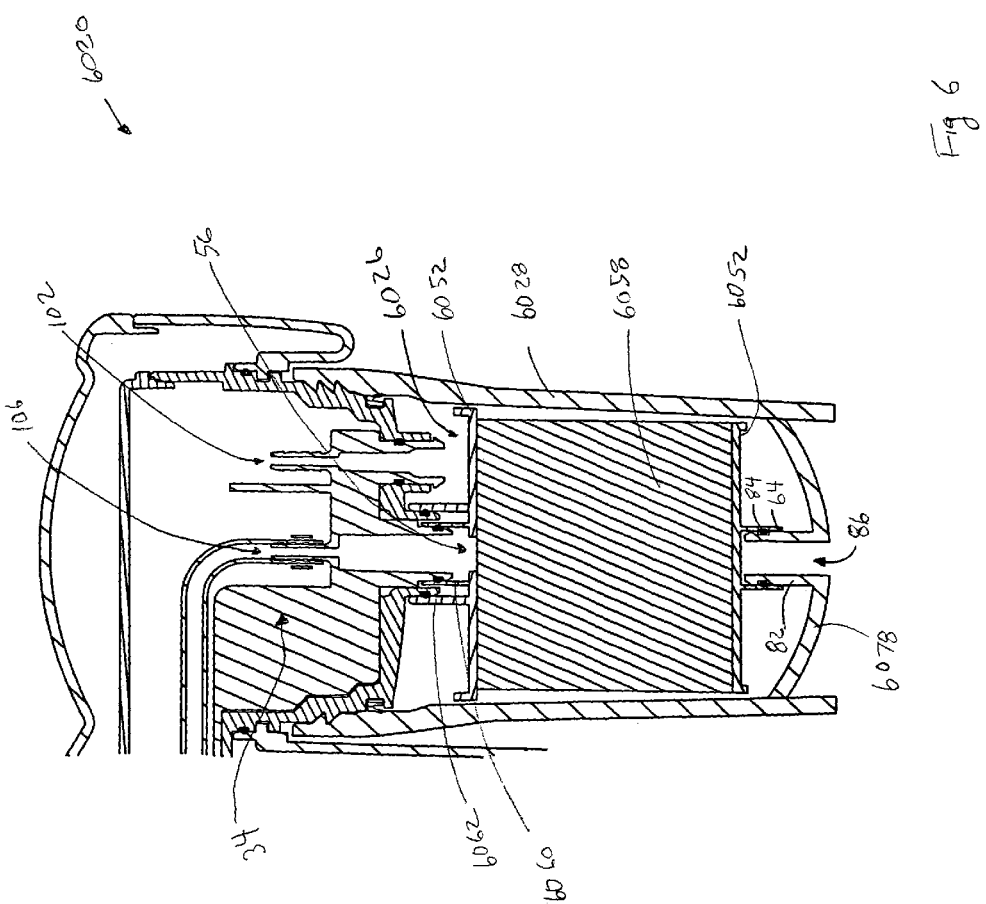
FIG. 6 is a partial cross-sectional side view of an alternate embodiment of the water filter device of FIG. 1 taken along the line A-A, wherein an opening is formed through the filter vessel.

The water filter 26 may be seated within the filter vessel 28 such that when the filter vessel 28 is removed from the control head 34, the water filter 26 remains within the interior volume of the filter vessel 28. As described in U.S. patent application Ser. No. 60/473,271, and as shown in FIG. 6, the filter vessel 6028 may have a plug housing 82 located at its second end such that an opening 86 through the filter vessel 6028 is formed. An o-ring 84 may surround the plug housing 82, or the third tube 64 of the water filter 6026 such that the third tube 64 of the water filter 6026 and the plug housing 82 of the filter vessel 6028 sealingly connect. Thus, when the filter vessel 6028 is removed from the control head 34, and is filled with untreated drinking water, it may be taken to a sink in the upright position, and the water filter 6026 may be removed from it, unsealing the plug housing 82, allowing untreated drinking water to egress from the opening 86 of the filter vessel 6028.

E. The Storage Housing

As previously shown in FIG. 1, the storage housing 30 may have an open top portion 31 for receiving treated drinking water, a closed bottom portion 33, and an interior volume 35. The storage housing 30 may also have an opening in its bottom portion 33, for receiving the dispenser 36. The storage housing 30 may be shaped for holding a predetermined amount of treated drinking water. The storage housing may be any shape capable of holding a predetermined amount of treated drinking water. The storage housing 30 may be made from one or more of a variety of materials, including, but not limited to, one or a combination of plastics, metal and alloys thereof, fiberglass, etc.

The storage housing 30 may have a vertically oriented window 88 for displaying the level of treated drinking water contained within the storage housing 30. Other means, such as a tube with a buoyant object (e.g., a buoyant colored bead) may also be used to indicate the level of treated drinking water within the storage housing 30.

The storage housing 30, or a portion thereof, may be separably removed from the water filter device 20 such that it is removed without any other component of the water filter device 20 being attached to or contained within it. The storage housing 30 may then be more easily cleaned as no other component of the water filter device 20 would obstruct a portion of the storage housing 30 to be cleaned, and as the storage housing 30 would be able to be oriented in any manner that the user finds most accommodating for cleaning it. Further, when the storage housing 30 is removed, cleaners may be used that would otherwise not be used because the cleaners would migrate into internal parts of the control head 34 if the storage housing 30 was cleaned with cleaners while attached to the water filter device 20. However, when the storage housing 30 is removed, such cleaners may be used and the storage housing 30 may be thoroughly washed out. When the storage housing 30 is removed, the other components would be also be exposed, and more easily cleaned.

The storage housing 30 may hold from about 0.5 liters (herein, "L") to about 20 L, from about 1 L to about 12 L, or from about 2 L to about 6 L of treated drinking water. Its capacity allows its users to obtain water during times when there is no water pressure. The average household uses from about 4 liters per day (herein "L/day") to about 10 L/day of treated drinking water for cooking and drinking per day.

F. The Storage Housing Cover

As previously shown in FIG. 1, the storage housing cover 32 may be used for completely or partially covering the open end of the storage housing 30. The storage housing cover 32 may prevent contaminants from contaminating the volume of treated drinking water collected in the storage housing 30. The storage housing cover 32 may be completely removable, or may be operably attached (e.g., hinged, sliding, etc.) to the storage housing 30.

G. The Control Head

Figure 7:
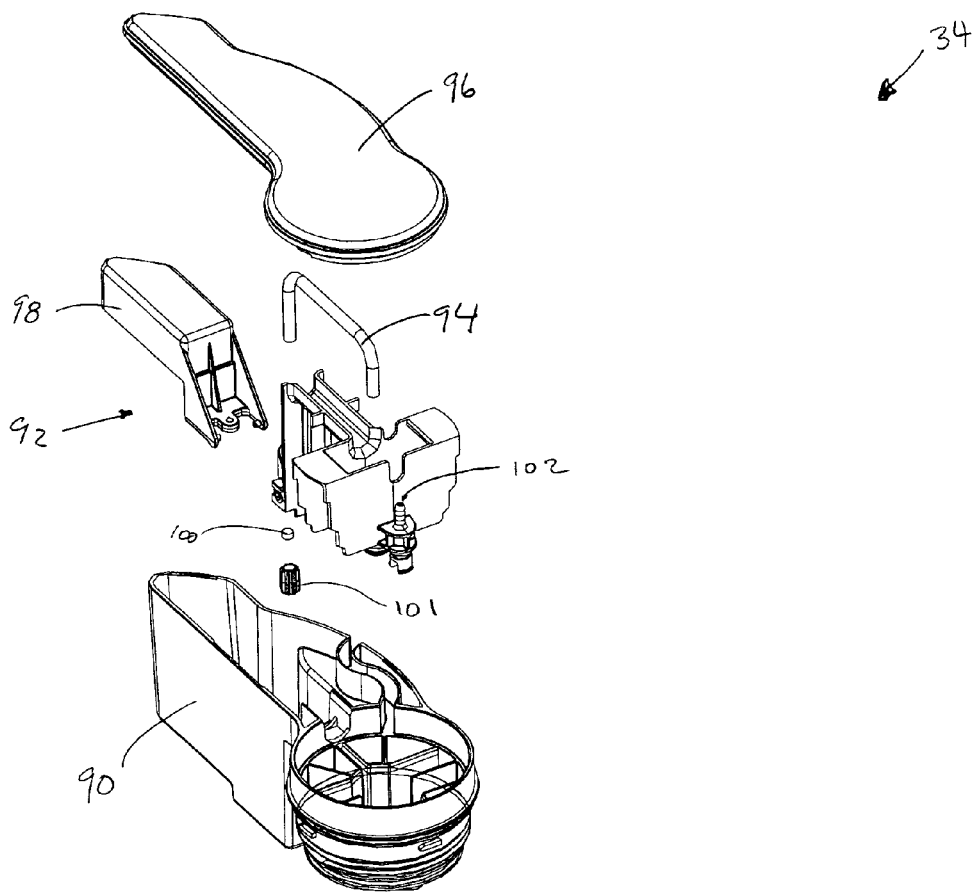
FIG. 7 is an exploded perspective view of the control head of the water filter device of FIG. 1.

As shown in FIG. 7, the control head 34 may comprise a control head housing 90, a shutoff valve 92, a control head hose 94, and/or a control head lid 96. The control head 34 may fluidly connect the water filter 26 and the storage housing 30, such that the two are in fluid communication, and such that a portion of the control head 34 is within the interior volume of the storage housing 30 and/or the filter vessel 28. The portion of control head housing 90 which may be within the interior volume of the storage housing 30 may have an open bottom portion such that as treated drinking water in the storage housing 30 rises, it may also rise within the control head housing 90, and may contact the shutoff valve 92 within the control head housing 90.

The shutoff valve 92 may comprise a float 98 and/or a stopper 100, and a stopper casing 101 connected to its base portion. The stopper 100 may arrest the flow of treated drinking water into the storage housing 30 (explained in more detail below). The shutoff valve 92 may, alternatively, include a diaphragm, piston with a spring that responds to the water pressure of a full tank to move a stopper, etc. (not shown). As previously shown in FIG. 5, the control head 34 may comprise a first control head inlet 102 and second control head inlet 104, and a first control head outlet 106 and second control head outlet 108. The second control head inlet 104 and second control head outlet 108 may be connected by a control head hose 94. The shutoff valve 92 may be contained within the control head housing 90, such that the control head lid 96 encases it. The float 98 may be flexibly (e.g., pivotally) connected to the control head housing 90 such that as treated drinking water rises within the control head housing 90, the float 98 may rise, and the stopper 100 and the stopper casing 101 may fluidly seal the second control head outlet 108, thus arresting the flow of water into the storage housing 30. The control head 34 may be made from one or more of a variety of materials, including, but not limited to, one or a combination of plastics, metal and alloys thereof, fiberglass, rubber, etc.

Because the stopper 100 automatically arrests the flow of water through the water filter device 20, a user may turn on the untreated drinking water source and tend to other things because the user may depend on the water filter device 20 to stop the filter of untreated drinking water once the capacity of the storage housing 30 is reached, thus preventing an overflow situation (this feature makes the water filter device 20 self-filling).

H. The Dispenser

As previously shown in FIG. 1, the dispenser 36 may be sealingly connected (using o-rings 117) to an opening at the bottom portion 33 of the storage housing 30. The dispenser 36 may dispense treated drinking water stored within the interior volume of the storage housing 30. The dispenser 36 may comprise a dispenser body 110, a dispenser handle 112, a dispenser inlet 116, and a dispenser outlet 118. The dispenser handle 112 (by turning, flipping, sliding, etc.) may be used to direct the flow of treated drinking water. The dispenser 36 may be made from one or more of a variety of materials, including, but not limited to, one or a combination of plastics, metal and alloys thereof, fiberglass, etc.

I. The Wall-Mount Bracket

Figure 8:
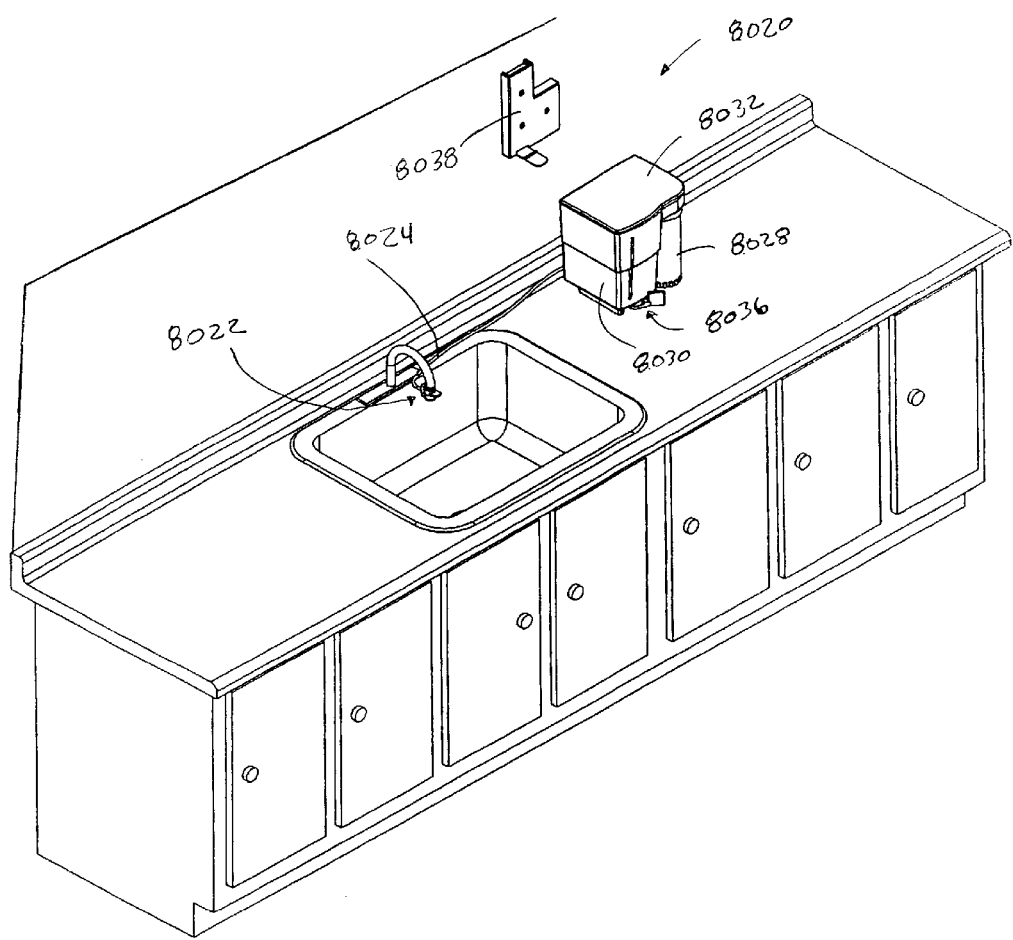
FIG. 8 is a perspective view of an alternate embodiment the water filter device of FIG. 1, wherein the wall-mount bracket is fixed on a wall.

As previously shown in FIGS. 1, and as shown in FIG. 8, the wall-mount bracket 8038 may be shaped for connecting to a planar wall or cabinet, and for releasably connecting to the storage housing 8030. The connection to the wall-mount bracket 8038 may be at the back, side, top and/or bottom portion of the water filter 8026. The wall-mount bracket 8038 may be made from one or more of a variety of materials, including, but not limited to, one or a combination of plastics, metal and alloys thereof, fiberglass, rubber, etc.

J. The Flow Regulator

As previously shown in FIG. 5 (Detail A), the flow regulator 39 may be the housing making up the second control head outlet 108, such that the diameter of the opening, distance L3, may be a diameter from about 0.2 mm to about 6 mm, from about 0.4 mm to about 3 mm, or from about 0.7 mm to about 1.5 mm. The flow regulator 39 may be any predefined opening capable of restricting the flow rate to maintain an average fluid contact time of at least about 3 seconds, at least about 4 seconds, and/or at least about 5 seconds at a pressure of up to about 100 psi. The flow regulator 39 may additionally be a hose having a predetermined diameter, a flow washer that is made of flexible material that reduces the hole size as flow rate increases, etc.

The connector hose 24, the connector inlet 46 or first or second connector outlet 48 and 50, or the first or second control head inlet 102 or outlet 104 may be sized to slow the flow of higher pressure water through the water filter device 20 without impacting the flow of low-pressure water through the water filter device 20. The flow regulator 39 may be any part within the pressurized part of the system that creates a pressure drop. The flow regulator 39 allows for the water filter device 20 to be operable (that is, a water filter device 20 that fills the storage housing 30 at a rate of at least 5 mL/min) at low-pressures, and, at the same time, efficacious at higher pressures.

K. The Life Display

As previously shown in FIG. 1, the water filter device 20 may comprise a life display 40 for indicating the life remaining, or used, for the water filter 26. The life display 40 may be located on the storage housing cover 32, however, it may be located anywhere on the water filter device 20 such that it is visible to the user. The life display 40 may be a tear-away calendar, a liquid crystal display, a light emitting diode, a light bulb, or the like. The life display 40 may be a timer, where life of the water filter 26 is based on time (i.e., it indicates end of water filter 26 life based solely on time, regardless of the volume of water treated by the water filter 26) or may be based on volume (i.e., it indicates end of water filter 26 life based on the volume of water treated by the water filter 26).

End of water filter 26 life may be depicted by the appearance or disappearance of symbols (e.g., raindrops, crosses, etc.) and/or different colored lights (e.g., red, yellow, green, etc.). The life display 40 may be reset via insertion or removal of a new water filter 26, or by a reset button, switch, lever, etc. The life display 40 may be powered by alternating current, direct current, battery (including a long-life battery), solar power, etc.

III. Test Procedures

A. BET Test Procedure

The BET specific surface area and pore volume distribution are measured using a nitrogen adsorption technique, such as that described in ASTM D 4820-99, by multipoint nitrogen adsorption, at about 77K with a Coulter SA3100 Series Surface Area and Pore Size Analyzer manufactured by Coulter Corp., of Miami, Fla. This process can also provide the micropore, mesopore, and macropore volumes.

B. Point of Zero Charge Test Procedure

About 0.010 M aqueous KCl solution is prepared from reagent grade KCl and water that is freshly distilled under argon gas. The water used for the distillation is deionized by a sequential reverse osmosis and ion exchange treatment. About 25.0 mL volume of the aqueous KCl solution is transferred into six, about 125 mL flasks, each fitted with a 24/40 ground glass stopper. Microliter quantities of standardized aqueous HCl or NaOH solutions are added to each flask so that the initial pH ranges between about 2 and about 12. The pH of each flask is then recorded using an Orion model 420A pH meter with an Orion model 9107BN Triode Combination pH/ATC electrode, manufactured by Thermo Orion Inc., of Beverly, Mass., and is called "initial pH". About 0.0750±0.0010 g of activated carbon particles are added to each of the six flasks, and the aqueous suspensions are stirred (at about 150 rpm) while stoppered for about 24 hours at room temperature before recording the "final pH".

C. Bulk Oxygen Percentage by Weight Test Procedure

The bulk oxygen percentage by weight is measured using the PerkinElmer Model 240 Elemental Analyzer (Oxygen Modification; PerkinElmer, Inc.; Wellesley, Mass.). The technique is based on pyrolysis of the sample in a stream of helium at about 1000° C. over platinized carbon. The carbon samples are dried overnight in a vacuum oven at about 100° C.

D. ORP Test Procedure

The ORP is measured using the platinum redox electrode Model 96-78-00 from Orion Research, Inc. (Beverly, Mass.), and following the ASTM standard D 1498-93. The procedure involves the suspension of about 0.2 g of carbon in about 80 mL of tap water, and reading the electrode reading, in mV, after about 5 min of gentle stirring.

E. F-BLR Test Procedure

The housings for the axial flow filters with mesoporous carbon are made from Teflon® and consist of 2 parts, i.e., a lid and a base. Both parts have an outside diameter of about 12.71 cm (about 5") and inside diameter of about 7.623 cm (about 3"). The lid counter sets in the base with an o-ring (about 3" ID and about ⅛" thickness) compression seal. The inlet and outlet hose barb connectors are threaded into the lid and base with about 1/16" NPT pipe threads. About ½" thick by about 2 ¾" OD stainless steel diverter (with about 3/16" hole on the upstream side and about 6 mesh screen on the downstream side) is counter set into the lid of the housing. The function of the diverter is to distribute the inlet flow over the entire face of the filter. The lid and base of the housing engage such that a compression seal exists sealing the filter within the housing. The lid and the base held together using four about ¼" fasteners.

The filter is mounted inside the housing and water contaminated with about $1\times10^8$ CFU/L *E. coli* flows through at a flowrate of about 200 mL/min. The total amount of water flowing in can be about 2,000 filter material pore volumes or more. The *E. coli* bacteria used are the ATCC #25922 (American Type Culture Collection, Rockville, Md.). The *E. coli* assay can be conducted using the membrane filter technique according to process #9222 of the 20$^{th}$ edition of the "Standard Processes for the Examination of Water and Wastewater" published by the American Public Health Association (APHA), Washington, D.C. Other assays known in the art can be substituted (e.g. COLILERT®). The limit of detection (LOD) is about $1\times10^2$ CFU/L when measured by the membrane filter technique, and about 10 CFU/L when measured by the COLILERT® technique. Effluent water is collected after the flow of about the first 2,000 filter material pore volumes, assayed to count the *E. coli* bacteria present, and the F-BLR is calculated using the definition.

F. F-VLR Test Procedure

The housings for the axial flow filters with mesoporous carbon are the same as those described in the F-BLR procedure above. Water contaminated with about $1\times10^7$ PFU/L MS-2 flows through a housing/filter system at a flowrate of about 200 mL/min. The total amount of water flowing in can be about 2,000 filter material pore volumes or more. The MS-2 bacteriophages used are the ATCC #15597B (American Type Culture Collection, Rockville, Md.). The MS-2 assay can be conducted according to the procedure by C. J. Hurst, *Appl. Environ. Microbiol.*, 60(9), 3462 (1994). Other assays known in the art can be substituted. The limit of detection (LOD) is $1 \times 10^3$ PFU/L. Effluent water is collected after the flow of about the first 2,000 filter material pore volumes, assayed to count the MS-2 bacteriophages present, and the F-VLR is calculated using the definition.

IV. Water Filter Device Example

About 37 g of Nuchar® RGC mesoporous and basic activated carbon powder from MeadWestvaco Corp. of Covington, Va., is mixed with about 14 g of Microthene® low-density polyethylene (LDPE) FN510-00 binder of Equistar Chemicals, Inc. of Cincinnati, Ohio, and about 4 g of Alusil® 70 aluminosilicate powder from Selecto, Inc., of Norcross, Ga. The mixed powders are then poured into a circular aluminum mold. The mixed powders are then poured into an aluminum mold. The mold is closed and placed in a heated press with platens kept at about 204° C. for 1 h. Then, the mold is allowed to cool to room temperature, opened, and the filter material 58 is removed. The characteristics of the filter material 58 include: an outside diameter of 5.08 cm, a core diameter of 1.6 cm, a filter length of 6.35 cm, and a filter volume of 116 mL.

The filter material 58 is capped with a filter housing 52 as described above (using hot melt adhesive) to make up a water filter 26 as described above. The water filter 26 is inserted onto a control head 34 as described above. A filter vessel 28 is attached to the control head 34 as described above.

The connector inlet 46 is connected to an untreated drinking water source and a user turns on the untreated drinking water source. Untreated drinking water comprising $1 \times 10^6$ viruses per liter and $1 \times 10^7$ bacteria per liter flows into the connector inlet 46 through the connector body 42, bypassing the first connector outlet 48 connected to the connector hose 24, and bypass the rest of the water filter device 20, and then through the second connector outlet 50.

The user turns the connector handle 44 ninety degrees, from an open position to a closed position, such that the connector valve directs the flow of untreated drinking water to and through the first connector outlet 48 instead of the second connector outlet 50. Untreated drinking water then travels through the connector hose 24, into the first control head inlet 102, then into the filter vessel 28, filling the filter vessel 28, and entering the water filter 26 via the filter inlet 54. The untreated drinking water then radially enters the water filter material 58, and radially flow through the water filter material 58, being treated (bacteria reduced by 6 logs and viruses reduced by 4 logs), and then radially enter the core region 70 of the water filter material 58, and then axially flow through the core region 70, to and through the filter outlet 56.

Treated drinking water then flows from the filter outlet 56, through the first control head outlet 106, then through the control head hose 94, then through the second control head inlet 104, then through the second control head outlet 108, into the storage housing 30.

Treated drinking water then fills the interior volume 35 of the storage housing 30, meeting the dispenser 36 which is in a closed position, such that the flow of water may not pass through. Treated drinking water continues to fill the storage housing 30 such that it also begins to engulf the control head housing 90 until the float 98 is raised, thus raising the stopper 100 to a position which fluidly seals the second control head outlet 108, thus stopping the flow of treated drinking water into the storage housing 30 until enough pressure builds to stop the flow of untreated drinking water into the water filter device 20.

Treated drinking water is dispensed through the dispenser 36 by moving the dispenser handle 112 to an open position, such that treated drinking water flows into the dispenser inlet 116, through the dispenser body 110, and through the dispenser outlet 118. The dispensed treated drinking water may be captured in a container.

V. Modular Units

Figure 9:
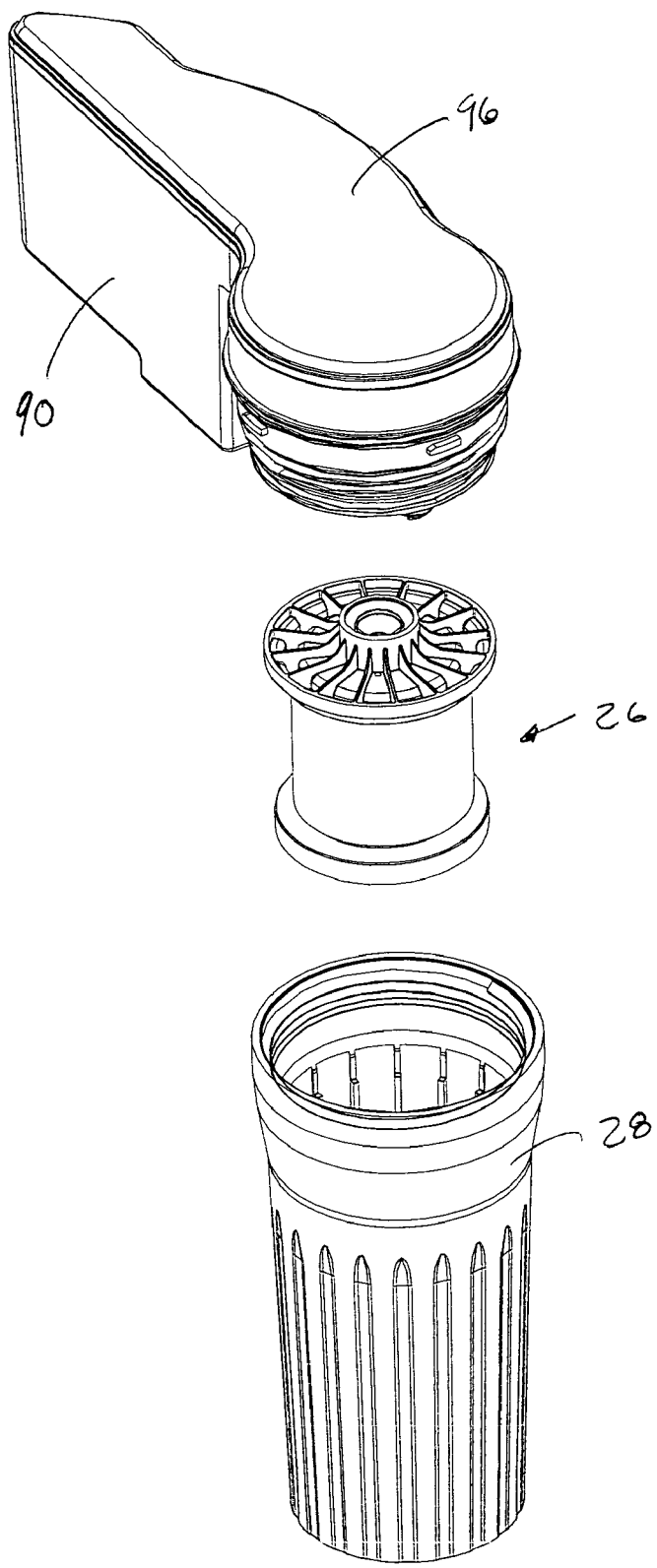
FIG. 9 is an exploded perspective view of the control head, water filter, and filter vessel of the water filter device of FIG. 1.

As shown in FIG. 9, the water filter device 20 may be used as a modular unit that may comprise the connector 22, the control head 34, the water filter 26, and/or the filter vessel 28. The same modular unit may be releasably (e.g., friction fitted, threadably fitted, bolted, screwed, fastened, snap fitted, latched, etc.) or permanently (e.g., molded, adhesively bonded, soldered, welded, hot plate welded, etc.) connected to different storage housings (e.g., 30). Thus, a manufacturer may produce the same modular unit for incorporation into a line of different storage housings (e.g., the same modular unit may be placed in storage housings having different interior volumes, colors, shapes, features, etc.). Also, a consumer may interchangeably use the same modular unit to different storage housings (e.g., countertop storage housings, refrigerator storage housings, etc.).

The present invention may additionally include information that will communicate to the consumer, by words and/or by pictures, that use of the invention will provide benefits associated with the water filter device 20, as well as providing said benefits at a minimum flow rate for a predetermined number of gallons. This information may include a claim of superiority over other water filter devices and products. Accordingly, the use of packages in association with information that will communicate to the consumer, by words and or by pictures, that use of the invention will provide the particular and related benefits as previously mentioned above. The information can include, e.g., advertising in all of the usual material, as well as statements and icons on the package, or the water filter device 20 itself, to inform the consumer.

All documents cited above are incorporated herein by reference; the citation of any document is not to be construed as an admission that it is prior art with respect to the invention.

While particular embodiments of the invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water filter device for treating untreated drinking water, said water filter device comprising:
   (a) a connector for providing fluid communication between said water filter device and an untreated drinking water source;
   (b) a low-pressure water filter in fluid communication with said connector, said low-pressure water filter for treating untreated drinking water, said water filter comprising a water filter material, said water filter material comprising filter particles consisting of mesoporous activated carbon, and said water filter having a Filter Bacteria Log Removal of greater than about 2 logs, wherein:

(i) the sum of the mesopore and macropore volumes of said filter particles is between about 0.2 mL/g and about 2 mL/g; wherein mesopore means an intra-particle pore having a diameter between 2 nm and 50 nm, and macropore means an intra-particle pore having a diameter greater than 50 nm;

(ii) the total pore volume of said filter particles is greater than about 0.4 mL/g and less than about 3 ml/g; and (iii) the ratio of the sum of mesopore and macropore volumes to the total pore volume of said filter particles is greater than about 0.3;

(c) a storage housing in fluid communication with said low-pressure water filter, said storage housing for storing treated drinking water treated by said water filter;

(d) an automatic shutoff valve in fluid communication with said storage housing, said automatic shutoff valve for arresting the flow of treated drinking water into said storage housing; and (e) a dispenser in fluid communication with said storage housing, said dispenser for dispensing treated drinking water from said storage housing;

wherein the treated drinking enters into said storage housing at the rate of at least about 5 mL/min but not greater than about 2,000 mL/min until activating said automatic shutoff valve, such that the flow of treated drinking water into said storage housing is arrested, wherein said water filter device is a non-electric water filter device, and wherein said water filter device is operable to remove microorganisms from said untreated drinking water flowing into said connector and out of said low-pressure water filter.

2. The water filter device of claim 1, wherein said mesoporous activated carbon particles comprise mesoporous and basic activated carbon particles.

3. The water filter device of claim 1, wherein said mesoporous activated carbon particles comprise mesoporous, basic, and reduced-oxygen activated carbon particles.

4. The water filter device of claim 1, wherein said water filter comprises a Filter Viruses Log Removal of greater than about 1 log.

5. The water filter device of claim 4, wherein said water filter comprises a Filter Bacteria Log Removal of greater than about 4 logs and a Filter Viruses Log Removal of greater than about 2 logs.

6. The water filter device of claim 5, wherein said water filter comprises a Filter Bacteria Log Removal of greater than about 6 logs and a Filter Viruses Log Removal of greater than about 4 logs.

7. The water filter device of claim 1, wherein said automatic shutoff valve comprises a float.

8. The water filter device of claim 1, wherein said water filter device further comprises a flow regulator, wherein said flow regulator regulates the flow of the untreated drinking water such that the average fluid contact time is greater than about 2 seconds up to about 120 psi.

9. The water filter device of claim 1, wherein said water filter device further comprises a flow regulator, wherein said flow regulator regulates the flow of the untreated drinking water such that the average fluid contact time is greater than about 4 seconds up to about 120 psi.

10. The water filter device of claim 1, wherein said water filter device further comprises a threadably attachable filter vessel for containing said water filter, wherein said filter vessel may be opened with from about 5 inch-lbs to about 100 inch-lbs of torque.

11. The water filter device of claim 1, wherein said water filter device further comprises a filter vessel for containing said water filter, wherein at least a portion of said filter vessel is oriented on a front or side portion of said water filter device.

12. The water filter device of claim 1, wherein said water filter device further comprises a filter vessel for containing said water filter, wherein the height of said filter vessel is less than about 75% the height of the water filter device.

13. The water filter device of claim 1, wherein said storage housing may be separably removed from said water filter device.

14. The water filter device of claim 1, wherein said storage housing comprises a window for viewing the volume of treated drinking water contained within said storage housing.

15. The water filter device of claim 1, wherein said water filter device further comprises a means of indicating the life of the water filter.

16. The water filter device of claim 1, wherein said water filter further comprises a pre-filter, wherein said pre-filter is selected from the group consisting of melt-blown polypropylene, non-woven polymer, micro-glass fiber, and non-woven cellulose filter material.

17. The water filter device of claim 1, wherein said storage housing has an interior volume from about 500 mL to about 2,000 mL.

18. The water filter device of claim 1, wherein said water filter device further comprises a filter vessel in fluid communication with said connector, said filter vessel for containing said water filter; wherein approximately 100% of the untreated drinking water that enters said water filter device via said connector is treated by said water filter, and wherein at least a portion of said filter vessel releasably attaches to a front or side portion of said water filter device.

19. The water filter device of claim 18, wherein the untreated drinking water radially enters and radially flows through said water filter material.

20. The water filter device of claim 18, wherein said filter vessel may be opened with from about 5 inch-lbs to about 100 inch-lbs of torque.

21. The water filter device of claim 18, wherein said storage housing may be separably removed from said water filter device.

22. The water filter device of claim 18, wherein said water filter further comprises a pre-filter, and said pre-filter is selected from the group consisting of melt-blown polypropylene, non-woven polymer, micro-glass fiber, and non-woven cellulose filter material.

23. The water filter device of claim 18, wherein said filter vessel may be released from said water filter device using a button.

* * * * *

UNITED STATES PATENT AND TRADEMARK OFFICE
CERTIFICATE OF CORRECTION

PATENT NO. : 7,615,152 B2 Page 1 of 1
APPLICATION NO. : 10/643669
DATED : November 10, 2009
INVENTOR(S) : Tanner et al.

It is certified that error appears in the above-identified patent and that said Letters Patent is hereby corrected as shown below:

Title Page; item (75):

Inventors, please delete "John D. Tanner, Plymouth, MN (US); David James Emmons, Plymouth, MN (US); Richard P. Riedel, Mason, OH (US)" and insert -- John D. Tanner, Plymouth, MN (US); David James Emmons, Plymouth, MN (US); Richard P. Riedel, Mason, OH (US); Michael Donovan Mitchell, Cincinnati, OH (US); Dimitris Ioannis Collias, Mason, OH (US) --

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,615,152 B2 | Page 1 of 1 |
| APPLICATION NO. | : 10/643669 | |
| DATED | : November 10, 2009 | |
| INVENTOR(S) | : Tanner et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 753 days.

Signed and Sealed this

Nineteenth Day of October, 2010

David J. Kappos
*Director of the United States Patent and Trademark Office*